United States Patent
Dinan

(10) Patent No.: US 8,582,525 B2
(45) Date of Patent: Nov. 12, 2013

(54) DYNAMIC MULTICARRIER OFDM TRANSMISSION

(75) Inventor: Esmael Hejazi Dinan, Herndon, VA (US)

(73) Assignee: Ofinno Technologies, LLC, Herndon, VA (US)

( * ) Notice: Subject to any disclaimer, the term of this patent is extended or adjusted under 35 U.S.C. 154(b) by 78 days.

(21) Appl. No.: 13/478,089

(22) Filed: May 22, 2012

(65) Prior Publication Data

US 2012/0307751 A1 Dec. 6, 2012

Related U.S. Application Data

(60) Provisional application No. 61/632,404, filed on Jun. 4, 2011, provisional application No. 61/500,740, filed on Jun. 24, 2011, provisional application No. 61/511,542, filed on Jul. 25, 2011.

(51) Int. Cl.
*H04W 4/00* (2009.01)
(52) U.S. Cl.
USPC .......................................................... 370/329
(58) Field of Classification Search
USPC ................. 370/328–337, 341, 431, 436, 437, 370/441–444, 458
See application file for complete search history.

(56) References Cited

U.S. PATENT DOCUMENTS

| 2009/0257387 | A1 | 10/2009 | Gholmieh et al. |
| 2011/0026475 | A1 | 2/2011 | Lee et al. |
| 2011/0081932 | A1 | 4/2011 | Astely et al. |
| 2011/0261704 | A1* | 10/2011 | Etemad .......................... 370/252 |
| 2012/0076101 | A1* | 3/2012 | Kojima .......................... 370/329 |
| 2013/0201945 | A1* | 8/2013 | Sun ................................ 370/329 |

FOREIGN PATENT DOCUMENTS

EP 2244409 A2 10/2010

* cited by examiner

*Primary Examiner* — Kwang B Yao
*Assistant Examiner* — Tung Q Tran
(74) *Attorney, Agent, or Firm* — Esmael Dinan; David Grossman

(57) ABSTRACT

A wireless device transmits a message to a server via a base station over a first plurality of subcarriers of a first uplink carrier. There is no guard band between any two subcarriers in the first plurality of subcarriers. The wireless device receives an activation command from a base station. The wireless device transmits data packets to the server via the base station over the first uplink carrier and at least one additional uplink carrier over a third plurality of subcarriers. There is at least one guard band between at least two subcarriers in the third plurality of subcarriers.

20 Claims, 9 Drawing Sheets

DYNAMIC MULTICARRIER OFDM TRANSMISSION

CROSS-REFERENCE TO RELATED APPLICATIONS

This application claims the benefit of U.S. Provisional Application No. 61/632,404, filed Jun. 4, 2011, entitled "Enhanced Voice and Data Transmission Using Orthogonal Subcarriers," and U.S. Provisional Application No. 61/500,740, filed Jun. 24, 2011, entitled "Multicarrier OFDM Transmission," and U.S. Provisional Application No. 61/511,542, filed Jul. 25, 2011, entitled "Multicarrier OFDM Transmission," which are hereby incorporated by reference in their entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention transmit and/or receive voice, multimedia, and/or data packets in a communication system. Embodiments of the technology disclosed herein may be employed in the technical field of multicarrier communication systems. More particularly, embodiments of the technology disclosed herein may relate to enhancing packet transmission and/or reception using a multicarrier communication system.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
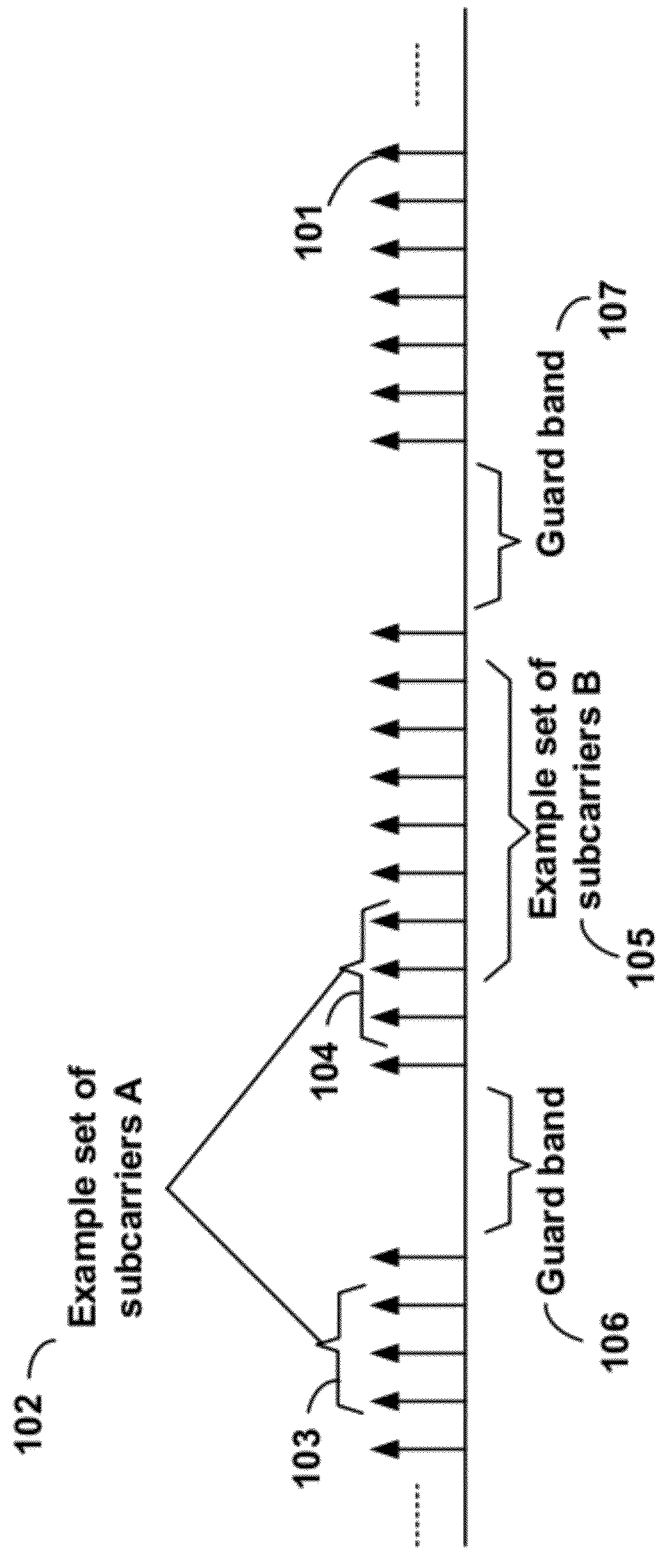
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers.

FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
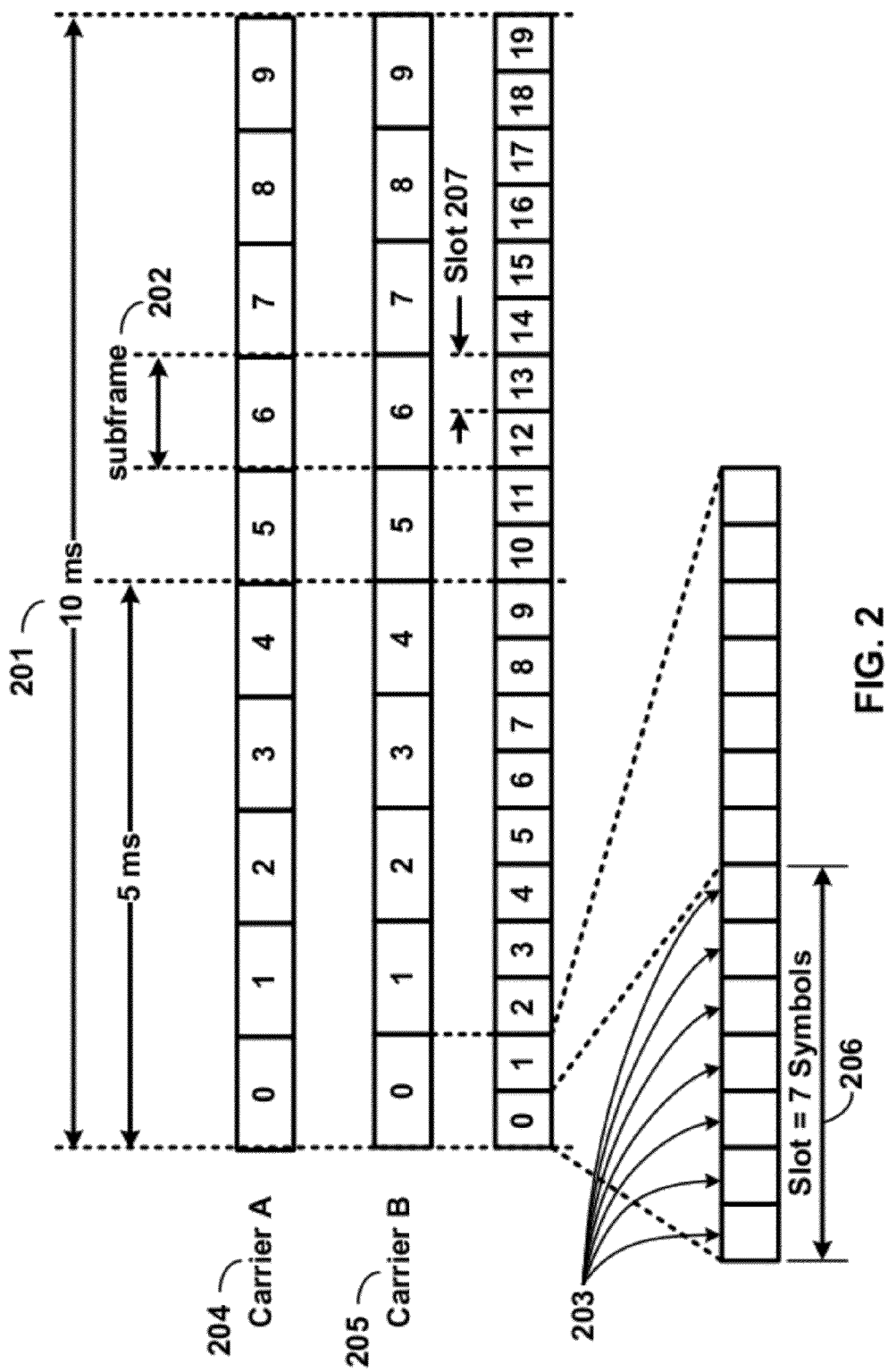
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other sub-frame durations such as including 0.5 msec, 1 msec, 2 msec, and 5 msec may also be supported. Sub-frame(s) may consist of two or more slots 206. For the example of FDD, 10 sub-frames may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
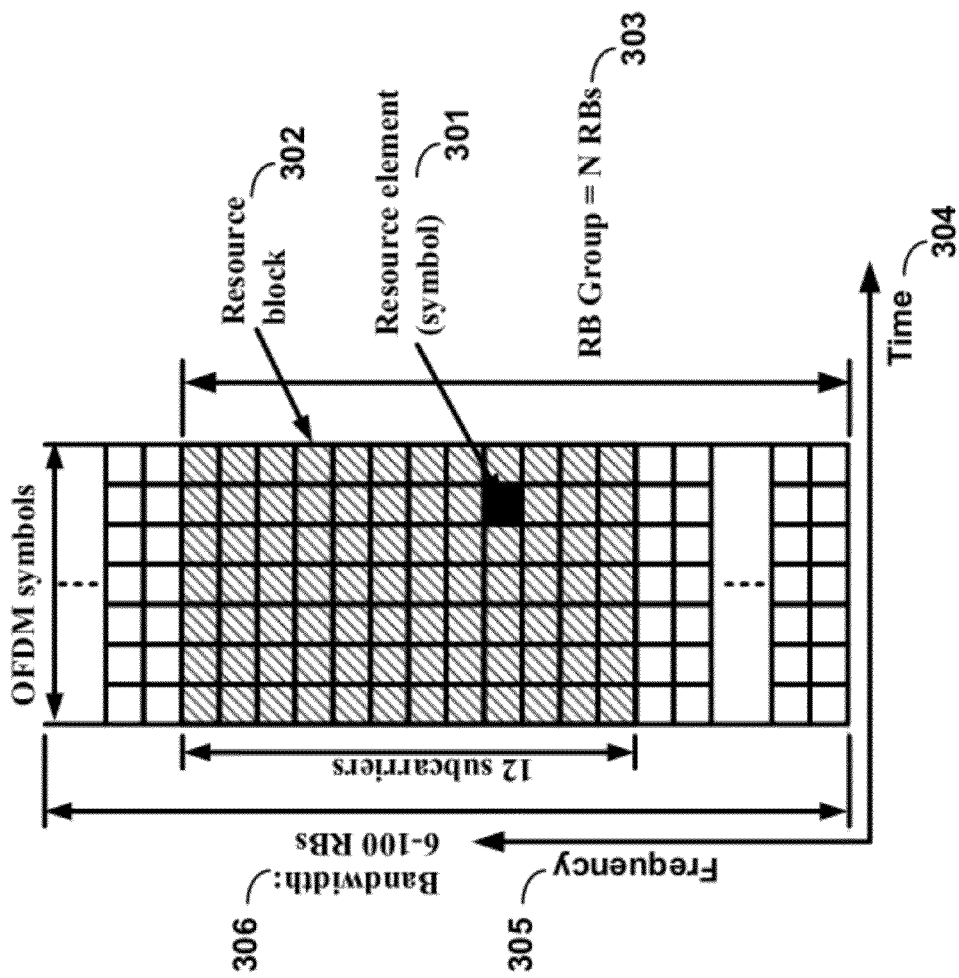
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, ..., 18} and {15, ..., 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
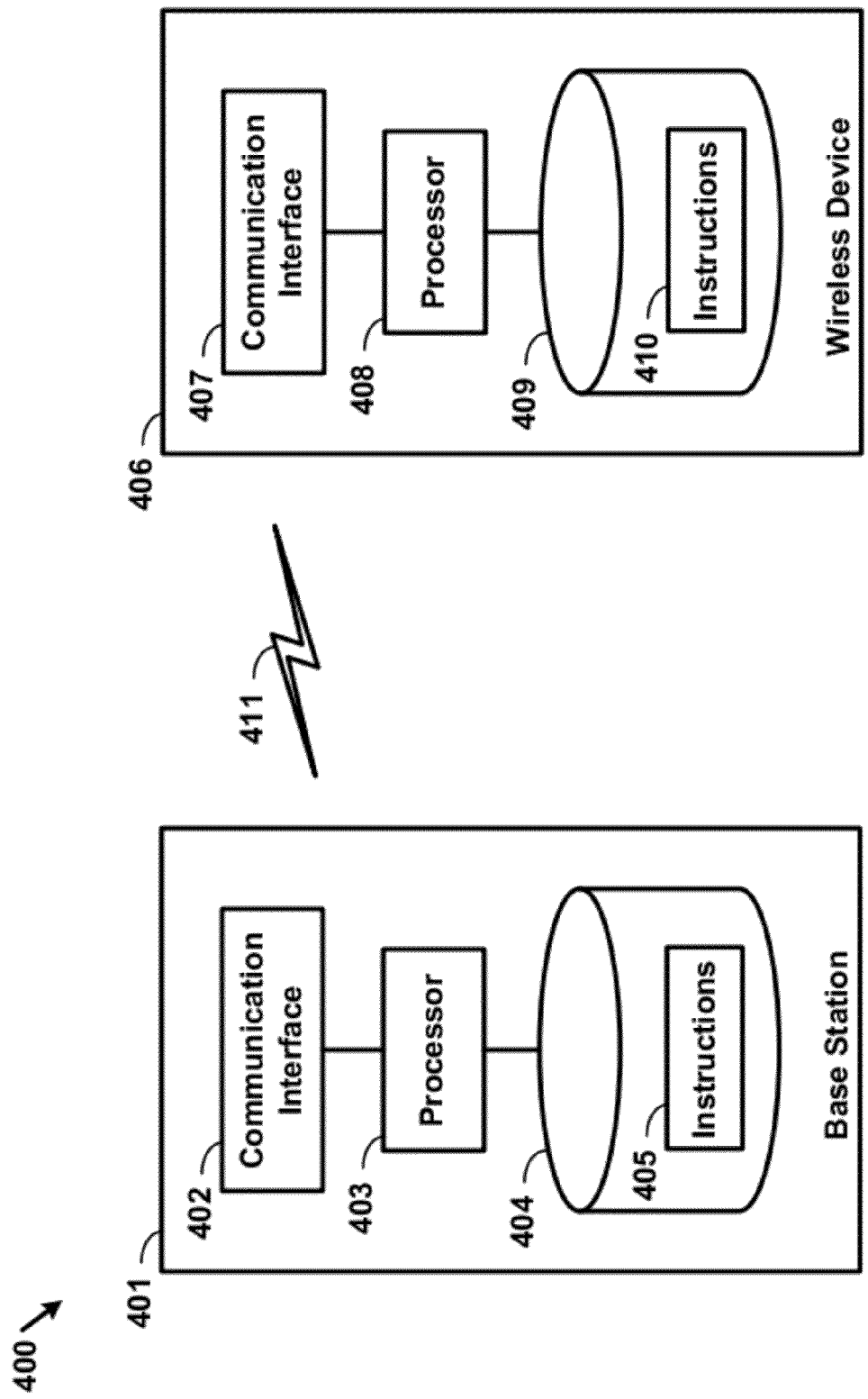
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

Figure 5:
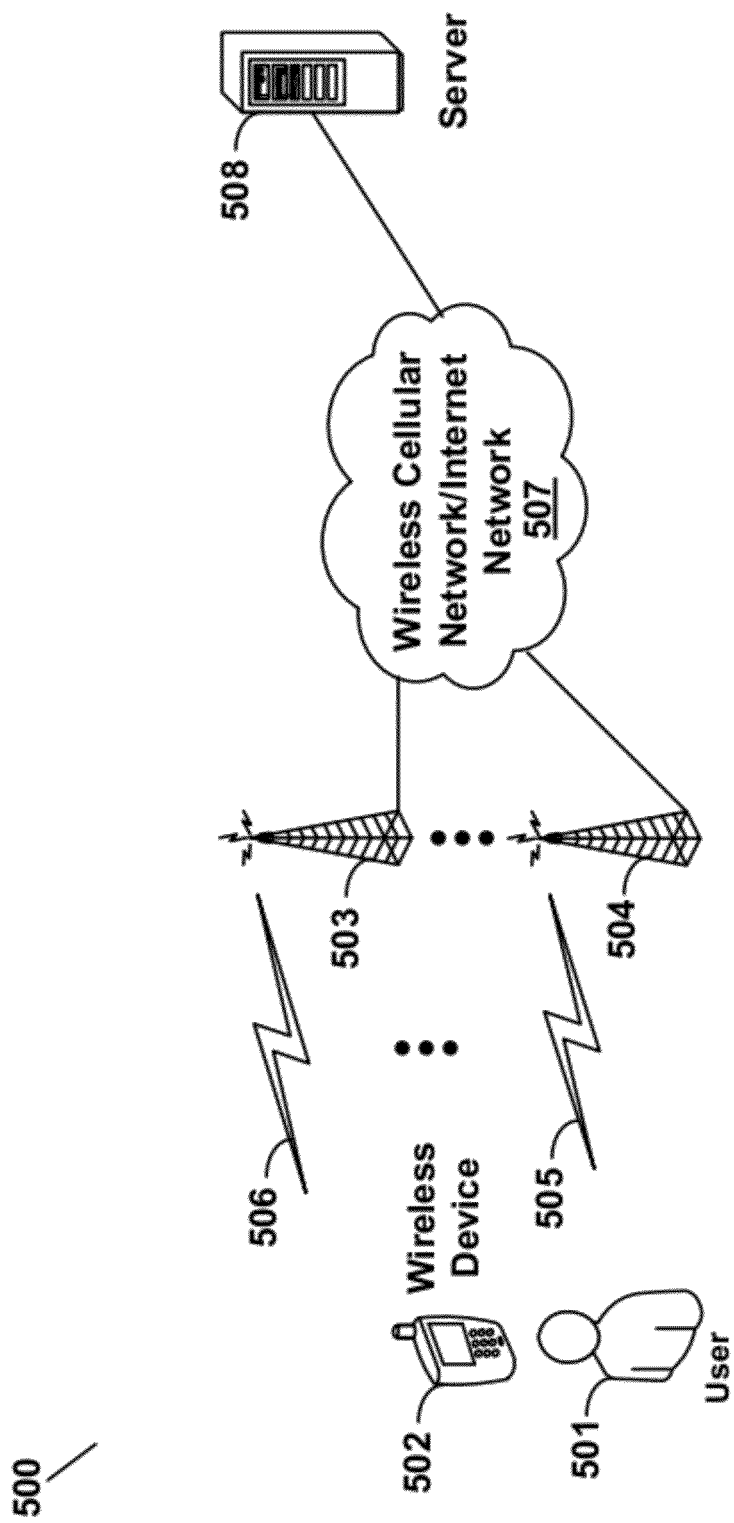
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more.

A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enable transmission and/or reception of packets in a multicarrier communication system. Other example embodiments may comprise a non-transitory tangible computer readable media comprising instructions executable by one or more processors to cause transmission and/or reception of packets in a multicarrier communication system. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to transmit and/or receive packets in a multicarrier communication system. The device may include processors, memory, interfaces, and/or the like. Other example embodiments may comprise communication networks comprising devices such as base stations, wireless devices (UE), servers, switches, antennas, and/or the like.

According to some of the various aspects of embodiments, the voice traffic may include a plurality of talking periods. Each of the plurality of talking periods may include a plurality of encrypted voice packets. The data traffic may include a plurality of encrypted data packets. Voice and data packets may be encrypted before transmission to secure the packets from unwanted receivers. The desired recipient may be able to decrypt the packets. Encryption may be optional and voice and/or data packets may be transmitted without encryption. If encryption is not enabled, the receiver may not need to decrypt the received packets. The example embodiments of the specification may apply to transmitters that transmit encrypted voice and/or data traffic and may also apply to transmitters that transmit unencrypted voice and/or data traffic.

According to some of the various embodiments, a transmitter may transmit the plurality of encrypted voice packets of a talking period on a first plurality of subcarriers. The first plurality of subcarriers may be assigned to the talking period in a set of substantially equally spaced subframes. There may be no guard band between any two subcarriers in the first plurality of subcarriers. In some other embodiments, the subframes for transmission may not be equally spaced. The base station packet scheduler may make the decision on which subframe is used for packet transmission. A base station may schedule the first transmission of voice packets in equally spaced subframes, and dynamically schedule retransmissions of voice packets. The retransmission packets may or may not be in equally spaced subframes. If a voice packet is not successfully decoded in the receiver, the transmitter may retransmit the voice packet using HARQ and/or ARQ retransmission techniques.

Example embodiments for voice and/or data transmission is presented in this specification. Voice traffic may be an example real-time application traffic. In some other embodiments, multimedia traffic, such as video-call traffic, may be scheduled for transmission in parallel with data traffic. Processes related to at least one talking period of a voice call may be applied to a process on at least one activity period in a video-call. Other examples may include transmission of data traffic and other types of multimedia traffic with low to moderate bit rates. In an example embodiment, the mechanism may be applied to two types of traffic, a type 1 traffic (for example, voice, video, music, and/or the like) and type 2 traffic (for example, data, http, file transfer, email, and/or the like). The categorization may not be limited to these examples. In an example embodiment, video may be considered as type 1 traffic and may be transmitted on one carrier. In another example embodiment, video may be considered type 2 traffic and may be transmitted on multiple carriers. In another example, type 1 traffic may be LTE non-GBR (non-guaranteed bit rate) traffic and type 2 traffic may be LTE GBR traffic.

All the voice packets in a given talking period may be transmitted using the first plurality of subcarriers. While at least some of the plurality of encrypted voice packets are transmitted, the transmitter may transmit a first subset of the plurality of encrypted data packets on a second plurality of subcarriers in a first time period and a second subset of the plurality of encrypted data packets on a third plurality of subcarriers in a second time period according to a scheduler decision. The transmitter may consider at least one and/or all of the following constraints in transmitting the data packets: a) The first time period and the second time period may not overlap, b) there may be no guard band between any two subcarriers in the second plurality of subcarriers, and c) there may be at least a guard band between at least two subcarriers in the third plurality of subcarriers. Such a scheduling algorithm may enable the base station to assign subcarriers for packet transmission to increase bandwidth efficiency in the system. This proposed transmission mechanism may provide a set of constraints for assigning wireless physical resources (subframes and subcarriers) to voice and data packet transmission that may result in increased overall air interface capacity.

According to some of the various embodiments, the voice packets may be transmitted on subcarriers of a first carrier. The first subset of the plurality of encrypted data packets may be transmitted on subcarriers of the same first carrier as the voice packets. There may be no guard band between any two subcarriers used for transmission of the voice and the first subset of the plurality of encrypted data packets. Voice packets and data packets may use different subcarriers. After the first time period, the base station may transmit an activation command to the wireless device to cause activation of at least one additional carrier. The second subset of the plurality of encrypted data packets may be transmitted on subcarriers of the first carrier and at least one of the at least one additional carrier. After the activation of the additional carriers, the voice packets of a talking period may be transmitted on the first carrier. Transmission of subsequent talking periods may also be on subcarriers of the first carrier. The second subset of data packets may be transmitted on a second plurality of subcarriers of the first carrier and at least one of the at least one additional carrier. There may be at least one guard band between at least two subcarriers in the second plurality of second subcarriers. Voice packets of subsequent talking periods may be transmitted on other carriers, depending on channel condition, mobility of the wireless device, or load balancing. In an example embodiment, data traffic may be IMS data traffic, HTTP traffic, RTP traffic, and/or the like.

According to some of the various embodiments, the transmitter may be a part of a base station and the receiver may be a part of a wireless device. The base station may transmit at least one control message to a wireless device on the first carrier. The base station may configure measurement parameters of the wireless device. The measurement configuration may trigger measurements of signal quality of at least one additional carrier in the plurality of carriers. The base station may receive at least one measurement report from the wireless device in response to the second control message. The at least one measurement report may comprise signal quality information of a first plurality of OFDM subcarriers of at least one additional carrier. The base station may transmit an activation command to the wireless device, if the at least one measurement report indicates an acceptable signal quality for a second carrier in the at least one additional carrier. The activation command may cause activation of the second carrier for the wireless device. The base station may transmit the second subset of the plurality of data packets to the wireless device on a second plurality of OFDM subcarriers in the first carrier and the second carrier. In another example embodiment, the transmitter may be a part of a wireless device and the receiver may be a part of a base station. According to some of the various embodiments, the transmitter may correspond to uplink transmission (in a wireless device) and/or downlink transmission (in a base station). In another example, the receiver may correspond to uplink reception (in a base station) and/or downlink reception (in a wireless device).

The method to assign encrypted data packets to the first subset or second subset may be executed by the MAC layer scheduler. The decision on assigning a packet to the first or second subset may be made based on data packet size, resources required for transmission of data packets (number of radio resource blocks), modulation and coding assigned to each data packet, QoS required by the data packets (i.e. QoS parameters assigned to data packet bearer), the service class of the subscriber transmitting or receiving the data packet, or subscriber device capability, or a combination of the above. For example, data packets transmitted to a device with limited capability may be assigned to the first carrier, and data packets transmitted to a device with more elaborate capabilities may be assigned to the first and/or second carriers.

Figure 7:
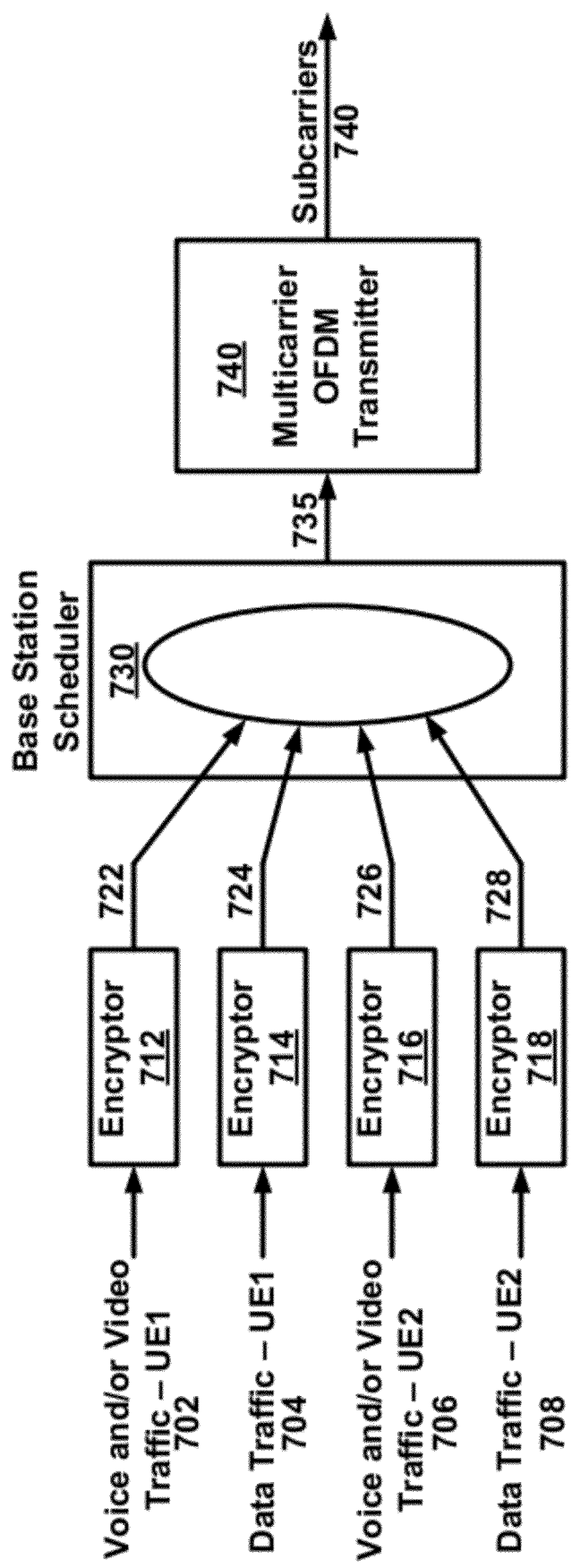
FIG. 7 is a block diagram depicting transmission of voice and/or video traffic and data traffic as per an aspect of an embodiment of the present invention.

FIG. 7 is an example block diagram depicting transmission of voice and/or video traffic and data traffic as per an aspect of an embodiment of the present invention. In this figure: UE1 refers to a first wireless device; and UE2 refers to a second wireless device. Voice and/or video traffic 702 intended for UE1 may be encrypted by encryptor 712. Data traffic 704 intended for UE1 may be encrypted by encryptor 714. Voice and/or video traffic 706 intended for UE2 may be encrypted by encryptor 716. Data traffic 708 intended for UE2 may be encrypted by encryptor 718. The encrypted packets 722, 724, 726, 728 may be routed through RLC layers to a MAC layer that may include base station scheduler 730. Base station scheduler 730 may forward scheduled MAC packets 735 to multicarrier transmitter 740. Multicarrier transmitter 740 may transmit subcarriers 740 containing MAC packets 735 to UE1 and UE2.

According to some of the various embodiments, wireless devices (for example: UE1, UE2) communicating with a base station may support different releases of LTE technology. For example, UE2 may support releases 8, 9, 10, or above of LTE, and UE1 may support releases 8, 9 (or for example may support release 8, or may support 8 & 9). In another example, user terminals (for example: UE1, UE2) communicating with a base station may support different capabilities of LTE technology. For example, UE2 may support carrier aggregation of multiple carriers, and UE1 may not support carrier aggregation of multiple carriers. UE1 may receive encrypted voice packets and data packets destined to UE1 on subcarriers of a single carrier. UE2 may receive voice packets on subcarriers of a first carrier. The first subset of encrypted data packets destined to UE2 may be transmitted on subcarriers of the same first carrier as the voice packets. Voice packets and data packets may use different subcarriers. After the first time period the base station may transmit an activation command to UE2 to activate at least one additional carrier. The second subset of encrypted data packets destined to UE2 may be transmitted on subcarriers of the first carrier and at least one of the at least one additional carrier. Packets may be transmitted on the first carrier and the at least one additional carrier according to a base station packet scheduler decision.

In this specification, packets may be referred to Service Data Units or Protocols Data Units at Layer 1, Layer 2 or Layer 3 of the communications network. Layer 2 in an LTE network includes three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and therefore a layer 3 packet may be an IP voice packet or an IP data packet. Packets may be transmitted and received via the air interface physical layer. A packet at the physical layer and/or MAC layer may be called a transport block. The methods and systems disclosed in this specification could be implemented at one or many different communication network layers. For example, some of the steps may be executed by the PDCP layer and some others by the MAC layer. In another example, a packet may refer to a transport block transmitted on LTE physical layer.

FIG. 1 is a diagram depicting example sets of OFDM subcarriers as per an aspect of an embodiment of the present invention. FIG. 1 depicts an example set of contiguous subcarriers and an example set of non-contiguous subcarriers separated by a guard band. Each arrow in the diagram depicts a subcarrier. For example, arrow 101 shows a subcarrier that may transmit information symbols. FIG. 1 shows two guard bands 106 and 107 in the transmission band. As illustrated in FIG. 1, guard band 106 is between the set of non-contiguous subcarriers A 102. The set of non-contiguous subcarriers 102 includes subcarriers 103 and subcarriers 104. FIG. 1 also illustrates a set of contiguous subcarriers B 105. There may be no guard band between any two subcarriers in a set of contiguous subcarriers, and the subcarriers are contiguous in the frequency band.

A guard band is a frequency region between two carriers which may not be assigned for transmission of data or control signals. For example, a guard band may include at least one null subcarrier. For example, in LTE technology, there may be at least one null subcarrier at each end of a carrier. When there is guard band between two carriers, the two carriers may be in the same frequency band or different frequency bands. For example, when there is a guard band between two carriers, there may be one or more guard bands and one or more other carriers between the two carriers.

According to some of the various aspects of embodiments, the plurality of voice packets may be encrypted using a first encryption key and at least one first parameter, and the plurality of data packets may be encrypted using the first encryption key and at least one second parameter, which may be different than the first parameter. The plurality of voice packets may be encrypted using an additional parameter that changes substantially rapidly over time. The plurality of data packets may be encrypted using an additional parameter that changes substantially rapidly over time. This encryption mechanism may provide a transmission that could not be easily eavesdropped by unwanted receivers. The first and second parameters may not be the same and this may make the encryption input parameters different for voice and data packets. Furthermore, including additional parameters in encryption module that changes substantially rapidly in time may enhance the security mechanism. An example varying parameter may be a type of system counter. The encryption may be provided by the PDCP layer between the transmitter and receiver. Additional overhead added to the transmission packets by the lower layers such as RLC, MAC, and Physical layer may not be encrypted before transmission. In another example embodiment, encryption may not be enabled for voice and/or data packets.

According to some of the various aspects of embodiments, a receiver may receive the plurality of encrypted voice packets of a talking period on a first plurality of subcarriers. The first plurality of subcarriers may be assigned to the talking period in a set of substantially equally spaced subframes. There may be no guard band between any two subcarriers in the first plurality of subcarriers. In some other embodiments, the subframes for reception may not be equally spaced. The base station scheduler may make the decision on which subframe is used for packet transmission. A base station may schedule the first transmission of voice packets in equally spaced subframes, and dynamically schedule retransmissions of voice packets. The retransmission packets may or may not be in equally spaced subframes. If a voice packet is not successfully decoded in the receiver, the transmitter may retransmit the voice packet using HARQ and/or ARQ retransmission techniques.

While at least some of the plurality of encrypted voice packets are received, the receiver may receive a first subset of the plurality of encrypted data packets on a second plurality of subcarriers in a first time period and a second subset of the plurality of encrypted data packets on a third plurality of subcarriers in a second time period according to a packet scheduler decision. The receiver may consider at least one and/or all of the following constraints in receiving the data packets: a) the first time period and the second time period may not overlap, b) there may be no guard band between any two subcarriers in the second plurality of subcarriers, and c) there may be at least a guard band between at least two subcarriers in the third plurality of subcarriers.

The method to assign encrypted data packets to the first subset or second subset may be executed by the MAC layer scheduler. The decision on assigning a packets to the first or second subset may be made based on data packet size, resources required for transmission of data packets (number of radio resource blocks), modulation and coding assigned to each data packet, QoS required by the data packets (i.e. QoS parameters assigned to data packet bearer), the service class of the subscriber transmitting or receiving the data packet, subscriber device capability, a combination of the above, and/or the like. For example, data packets received from a device with limited capability may be assigned to the first carrier, and data packets received from a device with multi-carrier capabilities may be assigned to the first and/or second carrier.

The plurality of encrypted voice packets may be decrypted using a first decryption key and at least one first parameter, and plurality of encrypted data packets may be decrypted using the first decryption key and at least one second parameter, which may be different than the first parameter. The plurality of voice packets may be decrypted using an additional parameter that may change substantially rapidly over time. The plurality of data packets may be decrypted using an additional parameter that may change substantially rapidly over time.

In the above transmitter and receiver example embodiments, each of the first, second, and third plurality of subcarriers may be a plurality of OFDM subcarriers. In other example embodiments, each of the first, second, and third plurality of subcarriers may be a plurality of SC-FDMA subcarriers.

According to some of the various embodiments, each of the first, second, and third plurality of subcarriers may be a plurality of physical subcarriers. In another example embodiment, each of the first, second, and third plurality of subcarriers may be a plurality of virtual or logical subcarriers.

"Virtual subcarriers" and "logical subcarriers" both may imply the same meaning in this disclosure. Physical subcarriers are the subcarriers that may be used for packet transmission in the physical layer. The relation between the logical subcarriers and physical subcarriers may be defined by tables and calculation rules, and may depend on different parameters (type of transmission, base station, user equipment ID's, and/or the like). Use of virtual subcarriers may provide frequency diversity in the system. For example, a set of contiguous virtual subcarriers assigned for a packet transmission may not be physically contiguous when mapped to physical subcarriers for transmission.

Figure 6:
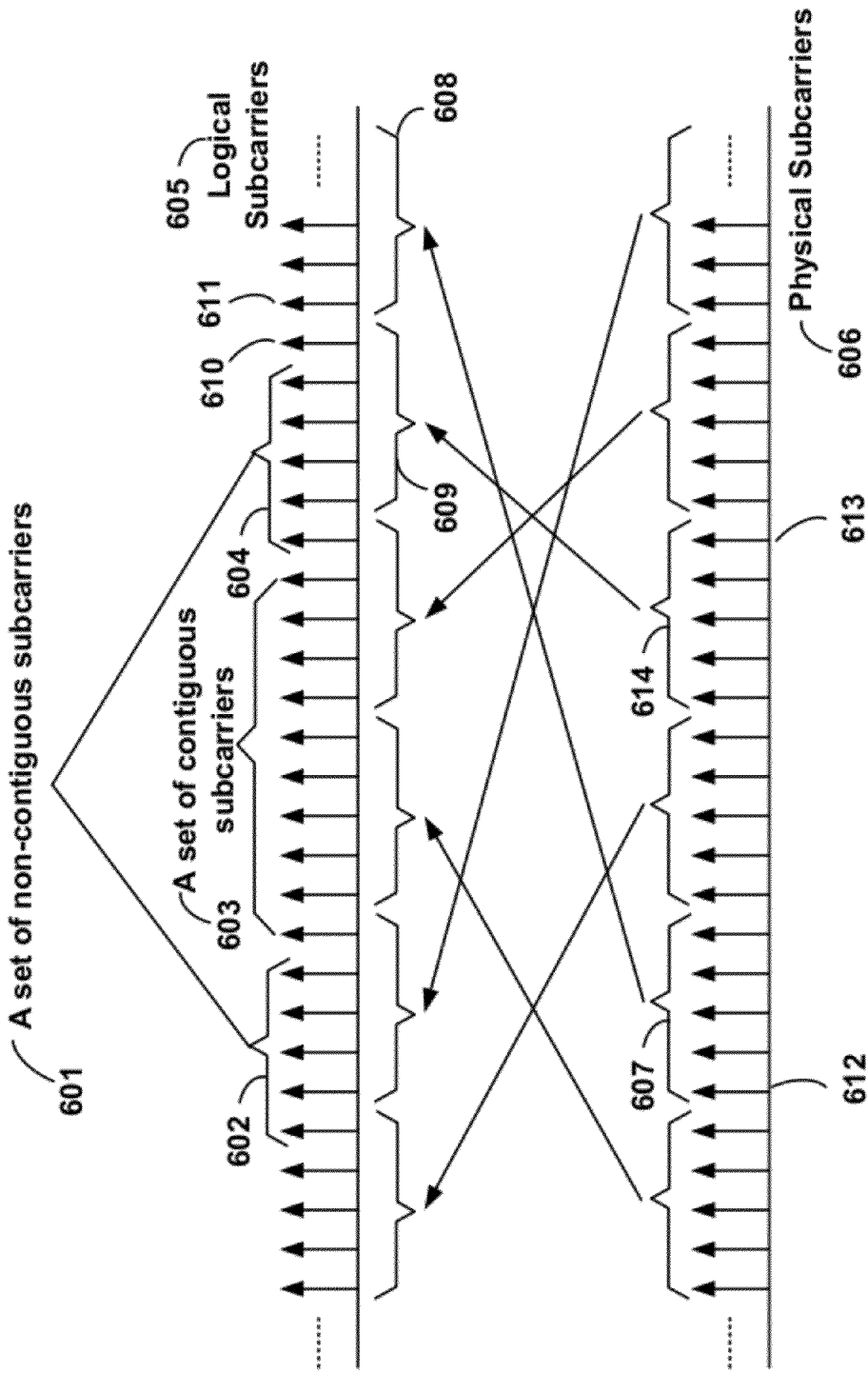
FIG. 6 is a diagram depicting an example set of logical subcarriers and an example set of physical subcarriers as per an aspect of an embodiment of the present invention.

FIG. 6 is a diagram depicting an example set of logical subcarriers and an example set of physical subcarriers. Logical subcarriers 605 may be mapped to physical subcarriers 606. As an example, the set of logical subcarriers 609 may be mapped to the set of physical subcarriers 614. And the set of logical subcarriers 608 may be mapped to the set of physical subcarriers 607. The subcarriers 610 and 611 may be contiguous in the logical domain, but when mapped to physical subcarriers, 613 and 612 may no longer be considered contiguous in the physical domain.

The scheduler may allocate logical subcarriers to voice and data packets. Those allocated logical subcarriers may be mapped to the physical layer for transmission by the wireless interface. As an example, the set of contiguous logical subcarriers 603 may be assigned for a packet transmission. Logical subcarriers 603 may be mapped to non-contiguous physical subcarriers. In another example, the set of non-contiguous logical subcarriers 601 may be assigned for a packet transmission. Non-contiguous logical subcarriers 601 include two subsets 604 and 602.

The plurality of voice packets may be mapped to a first pre-established bearer using packet protocol headers of the plurality of voice packets, and the plurality of data packets may be mapped to a second pre-established bearer using packet protocol headers of the plurality of data packets. Packet protocol headers may be used to distinguish voice packets from data packets. A voice packet bearer may have different QoS parameters when compared with a data packet bearer. Assigning voice and data packets to different bearers may allow the base station to manage QoS more efficiently. Example embodiments may apply to physical subcarriers or logical subcarriers according to the transmitter and scheduler configuration parameters.

The first pre-established bearer may be a GBR bearer and the second pre-established bearer may be a non-GBR bearer. A GBR or guaranteed bit rate bearer may be used for transfer of real-time packets, and a non-GBR bearer may be used for transfer of non-real-time packets. The second pre-established bearer (non-GBR bearer) may be assigned a plurality of attributes including: a scheduling priority, an allocation and retention priority, and/or a portable device aggregate maximum bit rate. These parameters may be used by the scheduler in scheduling non-GBR packets. GBR bearers may be assigned attributes such as delay, jitter, packet loss parameters and/or the like.

The first plurality of subcarriers, the second plurality of subcarriers, and the third plurality of subcarriers may include data subcarrier symbols and pilot subcarrier symbols. Pilot symbols may not carry user data, and may be included in the transmission to help the receiver to perform synchronization, channel estimation, signal quality detection, and/or the like. Base stations and mobile stations may use different methods to generate and transmit pilot symbols along with information symbols.

According to some of the various embodiments, a device for transmission of voice traffic and data traffic in a communication system is introduced. The device comprises a transmitter module configured to transmit the plurality of encrypted voice packets and data packets. The transmitter may transmit the plurality of encrypted voice packets of a talking period on a first plurality of subcarriers. The first plurality of subcarriers may be assigned to the talking period in a set of substantially equally spaced subframes. There may be no guard band between any two subcarriers in the first plurality of subcarriers. In some other embodiments, the subframes for transmission may not be equally spaced. The base station scheduler may make the decision on which subframe is used for packet transmission. A base station may schedule the first transmission of voice packets in equally spaced subframes, and dynamically schedule retransmissions of voice packets. The retransmission packets may or may not be in equally spaced subframes. If a voice packet is not successfully decoded in the receiver, the transmitter may retransmit the voice packet using HARQ and/or ARQ retransmission techniques.

The transmitter may transmit a first subset of the plurality of encrypted data packets on a second plurality of subcarriers in a first time period and a second subset of the plurality of encrypted data packets on a third plurality of subcarriers in a second time period according to a scheduler decision. The scheduler may consider constraints for transmission of data packets such as: the first time period and the second time period may not overlap; there may be no guard band between any two subcarriers in the second plurality of subcarriers; there may be at least a guard band between at least two subcarriers in the third plurality of subcarriers; a combination of the above, and/or the like.

According to some of the various embodiments, a device for receiving of voice traffic and data traffic in a communication system is introduced. The device may comprise a receiver configured to receive the plurality of encrypted voice packets and data packets. The receiver may receive the plurality of encrypted voice packets of a talking period on a first plurality of subcarriers assigned to the talking period. The first plurality of subcarriers may be assigned in a set of equally spaced subframes. There may be no guard band between any two subcarriers in the first plurality of subcarriers.

The receiver may receive a first subset of the plurality of encrypted data packets on a second plurality of subcarriers in a first time period and a second subset of the plurality of encrypted data packets on a third plurality of subcarriers in a second time period according to a base station packet scheduler decision. The scheduler may consider constraints such as: the first time period and the second time period may not overlap; there may be no guard band between any two subcarriers in the second plurality of subcarriers; there may be at least a guard band between at least two subcarriers in the third plurality of subcarriers; a combination of the above, and/or the like.

According to some of the various embodiments, a transmitter may transmit the plurality of encrypted voice packets of a talking period on a first plurality of subcarriers assigned to the talking period. For each of the plurality of encrypted voice packets of the talking period, a first part may be transmitted on a first subset of the first plurality of subcarriers in a first time period, and a second part may be transmitted on a second subset of the first plurality of subcarriers in a second time period. The transmitter may transmit the voice packets considering conditions such as: the first time period and the second time period may not overlap; the first subset of the first plurality of subcarriers and the second subset of the first plurality of subcarriers may be different; the first subset of the first plurality of subcarriers may consist of a plurality of contiguous subcarriers; the second subset of the first plurality of subcarriers may consist of a plurality of contiguous subcarriers; a combination of the above, and/or the like.

While at least some of the plurality of encrypted voice packets are transmitted, the transmitter may transmit a third subset of the plurality of encrypted data packets on a third plurality of subcarriers in a third time period and a fourth subset of the plurality of encrypted data packets on a fourth plurality of subcarriers in a fourth time period according to a scheduler decision. The transmitter may transmit the data packets considering conditions such as: the third time period and the fourth time period may not overlap; there may be no guard band between any two subcarriers in the third plurality of subcarriers; there may be at least a guard band between at least two subcarriers in the fourth plurality of subcarriers; a combination of the above, and/or the like.

According to some of the various embodiments, the voice packets may be transmitted on subcarriers of a first carrier. The third subset of the plurality of encrypted data packets may be transmitted on subcarriers of the same first carrier as the voice packets. Voice packets and data packets may use different subcarriers. After the third time period the base station may transmit an activation command to the wireless device to activate at least one additional carrier. The fourth subset of the plurality of encrypted data packets may be transmitted on subcarriers of the first carrier and at least one of the at least one additional carrier. After the activation of the additional carriers, the voice packets of the talking period may be transmitted on the first carrier. Transmission of subsequent talking periods may also be on subcarriers of the first carrier. Data packets may be transmitted on the first carrier and at least one of the at least one additional carrier. Voice packets of subsequent talking periods may be transmitted on other carriers, depending on channel condition, mobility of the wireless device, or load balancing. In an example embodiment, data traffic may be IMS data traffic, HTTP traffic, RTP traffic, and/or the like.

According to some of the various embodiments, the base station may transmit at least one control message to the wireless device on the first carrier. The base station may configure measurement parameters of the wireless device. The measurement configuration may trigger measurements of signal quality of at least one additional carrier in the plurality of carriers. The base station may receive at least one measurement report from the wireless device in response to the second control message. The at least one measurement report may comprise signal quality information of a first plurality of OFDM subcarriers of at least one additional carrier. The base station may transmit an activation command to the wireless device, if the at least one measurement report indicates an acceptable signal quality for a second carrier in the at least one additional carrier. The activation command activating the second carrier for the wireless device. The base station may transmit the fourth subset of the plurality of data packets to the wireless device on a plurality of OFDM subcarriers in the first carrier and the second carrier.

The method to assign encrypted data packets to the third subset or fourth subset may be executed by the MAC layer scheduler. The decision on assigning a packet to the third or fourth subset may be made based on data packet size, resources required for transmission of data packets (number of resource blocks), modulation and coding assigned to each data packet, QoS required by the data packets (i.e. QoS parameters assigned to data packet bearer), the service class of the subscriber transmitting or receiving the data packet, subscriber device capability, a combination of the above and/or the like. For example, data packets transmitted to a device with limited capability may be assigned to the first carrier, and data packets transmitted to a device with more elaborate capabilities may be assigned to first and at least one additional carrier.

According to some of the various embodiments, the receiver may receive the plurality of encrypted voice packets of a talking period on a first plurality of subcarriers assigned to the talking period. For each of the plurality of encrypted voice packets of the talking period, a first part may be received on a first subset of the first plurality of subcarriers in a first time period, and a second part may be received on a second subset of the first plurality of subcarriers in a second time period. The receiver may receive the voice packets using considering such as: the first time period and the second time period may not overlap; the first subset of the first plurality of subcarriers and the second subset of the first plurality of subcarriers may be different; the first subset of the first plurality of subcarriers may consist of a plurality of contiguous subcarriers; the second subset of the first plurality of subcarriers may consist of a plurality of contiguous subcarriers; a combination of the above and/or the like.

While at least some of the plurality of encrypted voice packets are received, the receive may receive a third subset of the plurality of encrypted data packets on a third plurality of subcarriers in a third time period and a fourth subset of the plurality of encrypted data packets on a fourth plurality of subcarriers in a fourth time period according to a base station packet scheduler decision. The receive may transmit the data packets considering conditions such as: the third time period and the fourth time period do not overlap; there is no guard band between any two subcarriers in the third plurality of subcarriers; there is at least a guard band between at least two subcarriers in the fourth plurality of subcarriers; a combination of the above, and/or the like.

The method to assign encrypted data packets to the third subset or fourth subset may be executed by the MAC layer scheduler. The decision on assigning a packet to the third or fourth subset may be made based on data packet size, resources required for transmission of data packets (number of resource blocks), modulation and coding assigned to each data packet, QoS required by the data packets (i.e. QoS parameters assigned to data packet bearer), the service class of the subscriber transmitting or receiving the data packet, subscriber device capability, a combination of the above, and/or the like. For example, data packets received from a device with limited capability may be assigned to a first carrier, and data packets received from a device with multi-carrier capabilities may be assigned to a second and one additional carrier.

Figure 8:
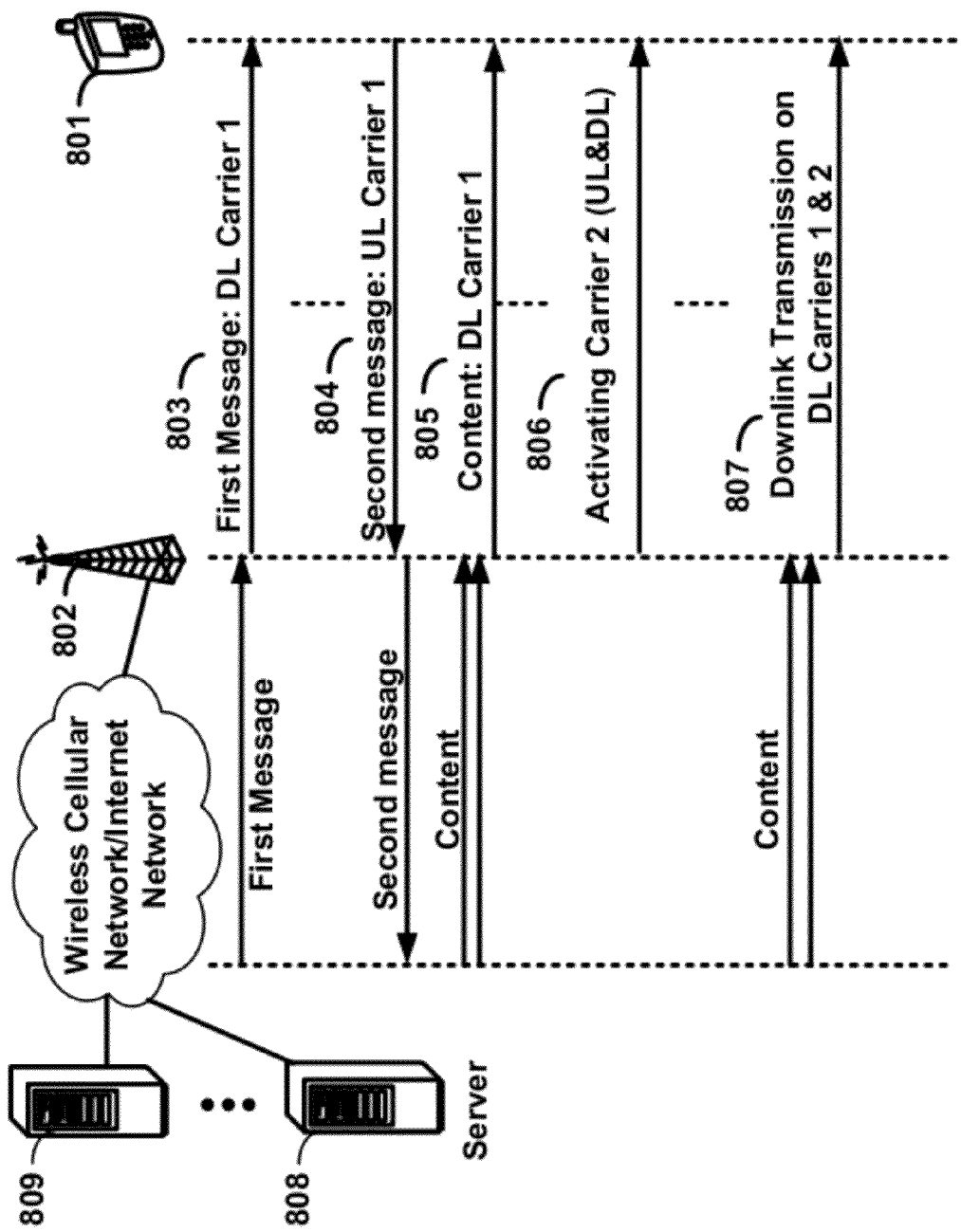
FIG. 8 depicts an example message flow between a base station, a wireless device and one or more servers, as per an aspect of an embodiment of the present invention.

FIG. 8 depicts an example message flow between a base station 802, a wireless device 801 and one or more servers 808 . . . 809, as per an aspect of an embodiment of the present invention. The base station 802 may transmit at least a first message 803 comprising a field describing content to the wireless device 801 over a first plurality of subcarriers of a first carrier in the plurality of carriers. There may be no guard band between any two subcarriers in the first plurality of subcarriers. The content descriptor may describe content residing on a server(s) 808 . . . 809 in a communication network. The content may or may not reside on the server(s) 808 . . . 809 originating the first message.

According to some of the various aspects of embodiments, a first message may be an MMS notification informing a mobile terminal user about available content. The MMS notification message may include MMS headers. Content may not be present in the MMS notification message. The purpose of the notification may be to allow a client to automatically fetch a multi-media content (MM) from the location indicated in the notification. In another example, the first messages may include a hyperlink in/to a web page informing the wireless device user about the possibility of requesting more information, for example, a hyperlink to a video, a file download link, a web page link, and/or the like. In another example, the first message may include a list of available video clips, multimedia channels, computer games, and/or the like. In another example, the first message may include an email or file name. In another example, the first message may be a part of IMS signaling to set up a call.

A message in the example embodiments may be referred to a message generated by an application server and transmitted to the wireless device via a base station. A message may be fragmented to multiple packets during the transmission in a communication network. For example, a base station may fragment the message into multiple MAC packets before transmission. The message may include some basic information about the data traffic content, such as: title, program, content size, content name, and/or the like. The content may be predetermined content pre-stored on a server. Examples of data content traffic include: multimedia file(s), data file(s), data object(s) in a database, http web page(s), live video transmission(s), a combination of the above, and/or the like. In another embodiment, the content may be a live streaming media that may not be pre-stored on the server. In some example embodiments, the base station and server may not transmit the first message. In these example embodiments, the base station may receive at least a second message from a wireless device without sending the first message. A base station may, selectively, based on one or more criterion, transmit a first message on one carrier. The one or more criterion may comprise the size of the first message. For example, if the first message is a large message or comprises content, the entire message may not be transmitted on a first carrier. The base station may, selectively, transmit a first part of the message on a first downlink carrier, and the base station may originate an activation command before transmitting a second part of the message. The activation command may also be transmitted on the first downlink carrier. The wireless device may transmit at least one feedback or response message to a server via the base station before the second part of the first message is received by the wireless device. The feedback or response message may be transmitted on subcarriers of a first uplink carrier. There may be no guard band between subcarriers used for transmission of the response or feedback message. The first uplink carrier may correspond to the first downlink carrier.

According to some of the various aspects of embodiments, the server 808 . . . 809 may receive at least a second message 804 from the wireless device 801 requesting for content via a base station. The request may be a packet directly or indirectly triggering the transmission of the content from the server. For example, the request may be an HTTP request, a request to receive MMS content, a request to receive an email attachment file, a request to receive the media content of a TV channel, a request to download a file, a request to start a computer game, a combination of the above, and/or the like.

According to some of the various aspects of embodiments, the base station 802 may receive at least one second message on a plurality of subcarriers. There may be no guard band between any two subcarriers in the plurality of subcarriers. In an example embodiment, the second message may be segmented into MAC packets or transmitted as one segment by a wireless device to the base station. A first part of a segment of the second message may be received on a first subset of a plurality of subcarriers in a first time period, and a second part of the segment may be received on a second subset of the plurality of subcarriers in a second time period. A segment may, for example, be a MAC transport block. The receiver may receive the segment considering conditions such as: the first time period and the second time period may not overlap; the first subset of the plurality of subcarriers and the second subset of the plurality of subcarriers may not entirely overlap; the first subset of the plurality of subcarriers may consist of a plurality of contiguous subcarriers; the second subset of the plurality of subcarriers may consist of a plurality of contiguous subcarriers; or the like. The base station may, selectively, based on one or more criterion, receive the second message on one carrier. One or more criteria may include the size of the second message.

The base station 802 may transmit a first plurality of content packets 805 to the wireless device over a second plurality of subcarriers of the first carrier. There may be no guard band between any two subcarriers in the second plurality of subcarriers. The first plurality of packets may include a first portion of the content that originated from the server. The content packets may originate from a network server 808 . . . 809. The base station 802 may transmit an activation command 806 originated from the base station. The activation command may be configured to cause the activation of at least one additional carrier in the plurality of carriers. The additional carrier may be activated within a time period (activation period) after the activation message is received by the wireless device. In an example embodiment, at least one additional carrier may be activated approximately 8 msec after the activation message is received. During this activation period, the base station may transmit packets on the first carrier, and may not transmit any packets on additional carrier(s). In another example embodiment, the base station may not transmit any packets during the activation period, and then may transmit packets after the activation period (when additional carrier(s) is/are activated).

The base station 802 may transmit a second plurality of packets 807 to wireless device 801 over the first carrier and additional carrier(s) over a third plurality of subcarriers. There may be at least a guard band between at least two subcarriers in the third plurality of subcarriers. The second plurality of packets may include a second portion of the content. The first portion of the content may be transmitted in a first time period and the second portion of the content may be transmitted in a second time period. The transmitter may consider constraints in transmitting the data packets such as: the first time period and the second time period may not overlap; the first time period may be before the second time period; a combination of the above, and/or the like. The first portion of the data traffic may be transmitted before the second portion of the data traffic.

The first plurality of packets 805 and second plurality of packets 807 may be transmitted through the same radio bearer and may require the same quality of service requirements. The decision of activating additional carriers may be made by the base station packet scheduler and may or may not be based on the packet transmission rate or transmission rate variations of the content originated from the server. The activation decision may be made locally by the base station packet scheduler based on information available to the scheduler, such as carrier load, size of buffer that queues packets for transmission to the wireless device, and/or the like. The scheduler may initially transmit content on a first carrier and then later may add additional carrier(s) for content packet transmission.

The server content traffic may be segmented into a plurality of MAC packets by the base station before transmission. The packets may include additional headers added by the base station, and may be further processed by the base station (for example, may be coded, encrypted, modulated and/or the like). The packets (or transport blocks) may consist of a first subset and a second subset. The first subset may be transmitted over the first carrier and the second subset may be transmitted over additional carrier(s). A scheduling control packet may be transmitted before each MAC packet in the first plurality of packets and the second plurality of packets is transmitted. The scheduling control packet may include information about the subcarriers used for packet transmission.

A first message, for example, may be an application layer message or a transport layer message, and/or the like. The base station may receive the first message from a network node, such as: a media server, an http server, an application server, and/or the like. The message may be originated from the server, or may be originated from another network node. The base station may employ PDCP/RLC/MAC/PHY layers to process the first message before transmission. The first message may describe the content. For example, the first message may describe the content by providing one or more of: content title, size, duration, content category, encoding, and/or the like.

A second message, for example, may be an application layer message or a transport layer message, and/or the like. The base station may receive the first message employing PDCP/RLC/MAC/PHY layers. The base station may transmit the received second message to a network node, such as: a media server, an http server, an application server, and/or the like.

The base station may receive the content originated from a network server. The first portion and the second portion of the data traffic may be encrypted, encoded, and/or modulated before being transmitted by the base station. The content traffic may be segmented by layer 2 of the base station. For example, a first plurality of packets may include a first portion of the content in the form of segmented, encrypted, encoded, and/or modulated data.

Transmitting a plurality of packets to a wireless device over a plurality of subcarriers may imply that a first subset of the packets may be transmitted over a first subset of the subcarriers and a second subset of the packets may be transmitted over a second subset of the subcarriers at the same or different subframes. Transmitting a plurality of packets to a wireless device over a first carrier and at least one additional carrier may imply that a first subset of the packets may be transmitted over the first carrier and a second subset of the packets may be transmitted over the at least one additional carrier at the same or different subframes.

The activation command by the base station may cause activation of a cell. A cell may comprise a downlink carrier and zero or one uplink carrier employed for data transmission. This may be referred to activating a carrier (downlink and/or uplink) in this specification. In actual implementation the MAC activation command may activate a cell, and cell activation may include carrier activation. The activation process may be controlled by base station MAC layer, and is generally performed selectively based on one or more criteria. The disclosed mechanism may be performed when certain criteria for the first message, second message, the content traffic, other wireless device application and/or the like are met. Example criteria may be based, at least in part, on message size, content size, content bit rate, and/or the like. When the one or more criteria are met, then the example embodiments may be applied. Therefore, it may be possible to implement example embodiments that selectively implement disclosed protocols.

Embodiments may be configured to operate as needed. The method may be applicable when the wireless device connects to the base station and one primary carrier is initially active. If during the initial connection with a server via a base station, more than one carrier is already active, then some of the example embodiments may refrain from performing disclosed setups. When other applications are running in parallel during the initial connection with the server, the traffic of other applications may cause a carrier activation process. If the traffic generated by other applications trigger a carrier activation, then the carrier activation in the example embodiments may not be needed. In an example, the activation command may be included in the packets transmitted by other applications. In another example, the activation command may be transmitted as a stand-alone packet or may be included in a packet. In these examples, the plurality of data packets may not need to include the activation command, and may include a portion of the content traffic originated by a server.

According to some of the various aspects of embodiments, a wireless device may receive a first message comprising a field describing the content from a server via a base station over a first plurality of subcarriers of a first downlink carrier in the plurality of carriers. There may be no guard band between any two subcarriers in the first plurality of subcarriers. The wireless device may transmit a second message to the base station requesting content. In some example embodiments, the wireless device may not receive the first message. The wireless device may transmit the second message to the server via the base station without sending the first message. The second message may be transmitted on a first uplink carrier corresponding to the first downlink carrier.

The wireless device may transmit at least a second message on a plurality of subcarriers. There may be no guard band between any two subcarriers in the plurality of subcarriers. In an example embodiment, the second message may be, selectively, segmented by the wireless device into one or more MAC packets before transmission. A first part of a MAC packet may be transmitted on a first subset of a plurality of subcarriers in a first time period, and a second part of the MAC packet may be transmitted on a second subset of the plurality of subcarriers in a second time period. The transmitter may transmit the second message considering conditions such as: the first time period and the second time period may not overlap; the first subset of the plurality of subcarriers and the second subset of the plurality of subcarriers may not entirely overlap; the first subset of the plurality of subcarriers may consist of a plurality of contiguous subcarriers; the second subset of the plurality of subcarriers may consist of a plurality of contiguous subcarriers; a combination of the above and/or the like.

The wireless device may receive a first plurality of content packets from the server via the base station over a second plurality of subcarriers of the first carrier. The content traffic transmitted and received by the base station may be processed before being forwarded by the base station. The base station may segment, encrypt, encode, add headers, and/or the like, to the received content traffic before transmitting the content traffic as a plurality of packets to the wireless device. There may be no guard band between any two subcarriers in the second plurality of subcarriers. The first plurality of packets may comprise a first portion of the data traffic originated from the server. The base station may transmit an activation command to the wireless device. The activation command may be generated by the base station. The activation command may be comprised in a packet in one of the first plurality of packets and then be transmitted. The activation command may be comprised in a MAC packet subheader and transmitted as a MAC command. The activation command may be configured to cause the activation of at least one additional carrier in the plurality of carriers. The additional carrier may be activated within a time period (activation period) after the activation message is received by the wireless device. In an example embodiment, the second carrier may be activated approximately 8 msec after the activation message is received. During this activation period, the wireless device may receive packets on the first carrier, and may not receive any packets on additional carrier(s). In another example embodiment, the wireless device may not receive any packets during the activation period, and then may receive packets after the activation period (when additional carrier(s) is/are activated).

The wireless device may receive a second plurality of content packets from the base station over the first carrier and one or more of the additional carrier(s) over a third plurality of subcarriers. There may be at least a guard band between at least two subcarriers in the third plurality of subcarriers. The second plurality of packets may comprise a second portion of the content originated from the server. The first portion of the content may be received in a first time period and the second portion of the content may be received in a second time period. The receiver may receive the data packets considering constraints such as: the first time period and the second time period may not overlap; the first time period may be before the second time period, a combination of the above, and/or the like. The first portion of the content may be received before the second portion of the content.

The second plurality of MAC content packets may consist of a first subset and a second subset. The first subset may be received over the first carrier and the second subset may be received over one or more of the additional carrier(s). A scheduling control packet may be received before each packet in the first plurality of packets and the second plurality of packets is received. The scheduling control packet may include information about transmission format and the subcarriers used for packet reception.

According to some of the various aspects of embodiments, the packets in the first plurality of packets and the second plurality of packets may be encrypted packets. Data packets may be encrypted before transmission to secure the packets from unwanted receivers. Content traffic may be encrypted before segmentation into MAC packets. The desired recipient may be able to decrypt the packets after re-assembly. The first plurality of packets and the second plurality of packets could be encrypted using an encryption key and at least one parameter that changes substantially rapidly over time. This encryption mechanism provides a transmission that could not be easily eavesdropped by unwanted receivers. Employing additional parameters in encryption module that changes substantially rapidly over time enhances the security mechanism. An example varying parameter could be any types of system counter. The encryption may be provided by the PDCP layer between the transmitter and receiver. Additional overhead added to the transmission packets by the lower layers such as RLC, MAC, and Physical layer may not be encrypted before transmission. In the wireless device, the plurality of encrypted data packets may be decrypted using a first decryption key and at least one first parameter. The plurality of data packets may be decrypted after re-assembly and using an additional parameter that changes substantially rapidly over time.

The activation command transmitted by the base station may be transmitted to the wireless device without encryption. The base station packet scheduler may make the decision on transmitting the activation command. The first plurality of subcarriers, second plurality of subcarriers and third plurality of subcarriers may be a plurality of OFDM subcarriers. The base station may deactivate the activation state (corresponding to a wireless device) of one of the additional carrier(s), if a timer associated with the additional carrier expires after a last content packet queued for transmission over one of the additional carrier(s) is transmitted. The wireless device may deactivating the state of one of the additional carrier(s), if a timer associated with one of the additional carrier(s) expires after a last content packet queued for transmission over one of the additional carrier(s) is received. A radio bearer may be established between the wireless device and the wireless network. The first message, the second message, the first portion of the data traffic, and the second portion of the traffic data may be transmitted and received by the base station and the wireless device over the same radio bearer. Such a scheduling algorithm may enable the base station to assign subcarriers for packet transmission to increase bandwidth efficiency in the system. This proposed transmission mechanism may provide a set of constraints for assigning wireless physical resources to data packet transmission that may result in increased overall air interface capacity.

The wireless device may be preconfigured with one or more carriers. When the base station is configured with more than one carrier, the base station may activate and deactivate the configured carriers. Therefore, configuration and activation of a carrier may be performed separately. One of the carriers (the primary carrier) may always be activated. Other carriers may be configured in the wireless device and may be deactivated by default and may be activated by base station when needed. The base station may be configured to cause the activation and deactivation of carriers by sending the activation/deactivation MAC control element. The UE may maintain a carrier deactivation timer per configured and active carrier and may deactivate the associated carrier upon the timer expiry. The same initial timer value may apply to each instance of the carrier deactivation timer and the initial value of the timer may be configured by the network. The configured carriers (unless the primary carrier) may be initially deactivated upon addition and after a handover.

According to some of the various aspects of embodiments, if an LTE wireless device receives an activation/deactivation MAC control element causing activation of a carrier, the wireless device may activate the carrier, and may apply normal carrier operation comprising at least one of: sounding reference signal transmissions on the carrier, CQI/PMI/RI reporting for the carrier, PDCCH monitoring on the carrier, PDCCH monitoring for the carrier, start or restart the carrier deactivation timer associated with the carrier, a combination of the above, and/or the like. If the wireless device receives an activation/deactivation MAC control element causing deactivation of a carrier, or if the carrier deactivation timer associated with the activated carrier expires, the base station and/or terminal may change the state (associated with the wireless device) of the carrier to in-active, and may stop the carrier deactivation timer associated with the carrier, and/or may flush all HARQ buffers associated with the carrier.

If PDCCH on the activated carrier indicates an uplink grant or downlink assignment, or if PDCCH on a carrier scheduling the activated carrier indicates an uplink grant or a downlink assignment for the activated carrier, then the wireless device may restart the carrier deactivation timer associated with the carrier. When a carrier is deactivated, the wireless device may not transmit SRS for the carrier, may not report CQI/PMI/RI for the carrier, may not transmit on UL-SCH for the carrier, may not monitor the PDCCH on the carrier, and/or may not monitor the PDCCH for the carrier.

The method to assign the first subcarriers, second subcarriers and third subcarriers to MAC packets may be executed by the MAC layer packet scheduler. The decision on assigning subcarriers to a packet transmission may be made based on data packet size, resources required for transmission of data packets (number of radio resource blocks), modulation and coding assigned to each data packet, QoS required by the data packets (i.e. QoS parameters assigned to data packet bearer), the service class of the subscriber receiving the data packet, subscriber device capability, a combination of the above, and/or the like.

Figure 9:
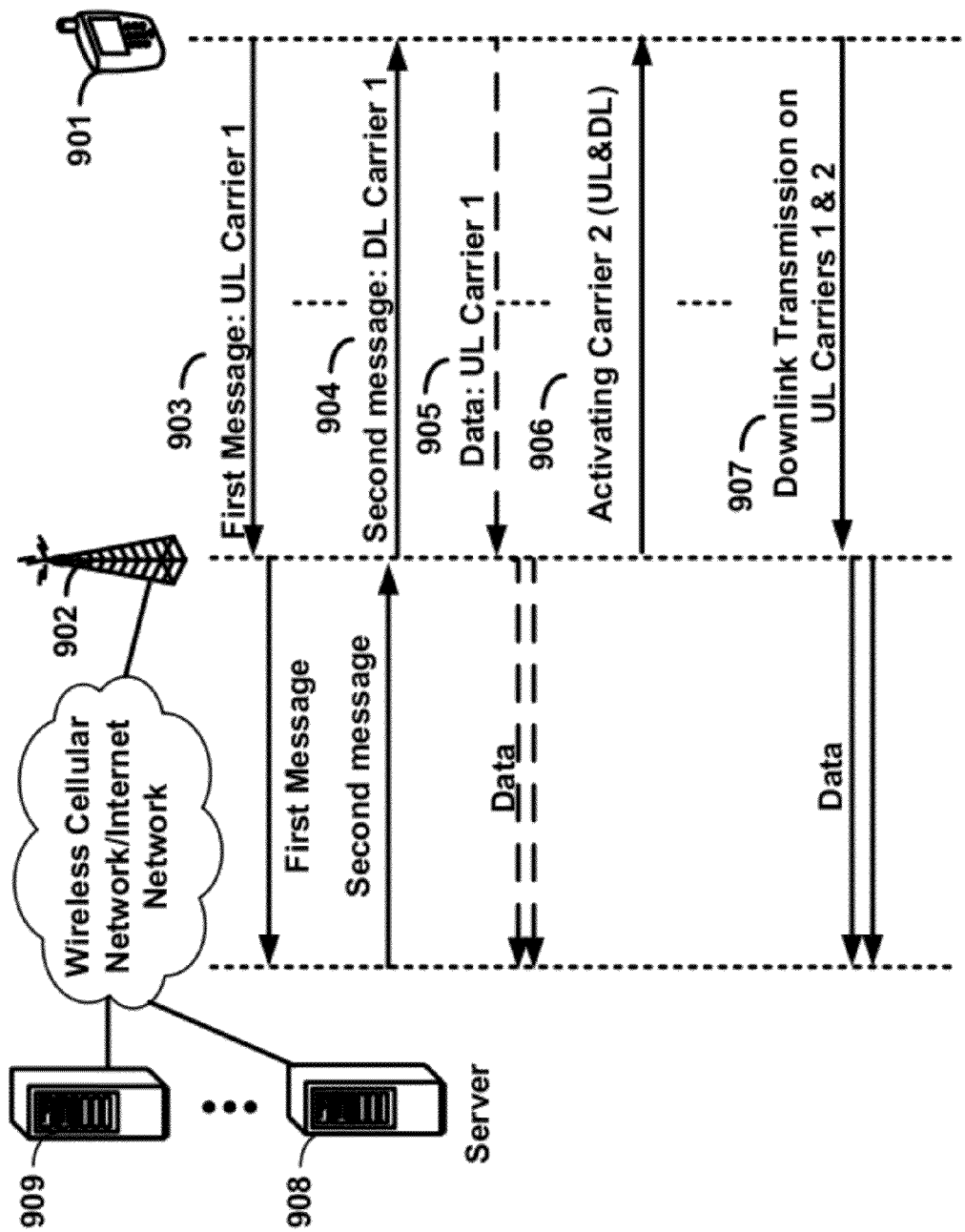
FIG. 9 depicts an example message flow between a base station, a wireless device, and one or more servers, as per an aspect of an embodiment of the present invention.

FIG. 9 depicts an example message flows between a base station 902, a wireless device 901, and one or more servers 908 . . . 909, as per an aspect of an embodiment of the present invention. Wireless device 901 may transmit a first message 903 to the server(s) 908 . . . 909 via the base station 902 over a first plurality of subcarriers of a first uplink carrier in the plurality of uplink carriers. There may be no guard band between any two subcarriers in the first plurality of subcarriers. The wireless device 901 may receive a second message 904 from the server via base station 902 on a downlink carrier. The second message 904 may respond to the first message 903. The downlink carrier may correspond to the first uplink carrier. Wireless device 901 may, depending of the configuration of servers 908 . . . 909 be connected to one or more severs. In many situations, wireless device 901 may act as if it is connected to a single server, when in fact, the wireless device 901 is connected to multiple servers. For the purpose of this disclosure the term "server(s)" reflects that wireless device 901 may be connected to a server configuration that may include one server, or a multitude of servers.

According to some of the various aspects of embodiments, the wireless device 901 may transmit at least one data packet 905 to server(s) 908 . . . 909 via the base station over a second plurality of subcarriers of the first uplink carrier. There may be no guard band between any two subcarriers in the second plurality of subcarriers. At least one data packet may comprises a first portion of the data traffic destined to the server. The wireless device 901 may receive at least one packet from the server via the base station in response to the at least one data packet. The wireless device may also receive an activation command 906 originated by the base station 902. The activation command may be configured to cause the activation of at least one additional uplink carrier in the plurality of uplink carriers. The wireless device may transmit a plurality of data packets to the server(s) via the base station over the first uplink carrier and the at least one additional uplink carrier over a third plurality of subcarriers. There may be at least one guard band between at least two subcarriers in the third plurality of subcarriers. The second plurality of packets may comprise a second portion of the data.

According to some of the various aspects of embodiments, the wireless device 901 may transmit a first message 903 to the server(s) via the base station 902 over a first plurality of subcarriers of a first uplink carrier in the plurality of uplink carriers. There may be no guard band between any two subcarriers in the first plurality of subcarriers. The wireless device may receive a second message from the server(s) 908 . . . 909 via the base station on a downlink carrier. The second message may be a response to the first message. The downlink carrier corresponds to the first uplink carrier. The wireless device 901 may receive an activation command 906 from a base station 902. The activation command 906 may be configured to cause the activation of at least one additional uplink carrier in the plurality of uplink carriers. The wireless device 901 may transmit a plurality of data packets 906 to the server via the base station 902 over the first uplink carrier and the at least one additional uplink carrier over a third plurality of subcarriers. There may be at least one guard band between at least two subcarriers in the third plurality of subcarriers. The second plurality of packets may comprise a portion of data that the wireless device intends to transmit to the server(s). In an example embodiment, the wireless device may transmit at least one packet to the server(s) via the base station over a second plurality of subcarriers of the first uplink carrier before receiving the activation command. There may be no guard band between any two subcarriers in the second plurality of subcarriers. In another example embodiment, the wireless device may not transmit at least one packet to the server(s) before receiving the activation command.

According to some of the various aspects of embodiments, the activation command by the base station may be configured to cause activation of a cell. A cell may comprise a downlink carrier and zero or one uplink carrier employed for data transmission. This may be referred to activating a carrier (downlink and/or uplink) in this specification. In implementation, the MAC activation command may be configured to activate a cell, and cell activation may include carrier activation. The activation process may be controlled by a base station MAC layer, and may be performed selectively based on one or more criteria. The disclosed mechanism may be performed when certain criteria for the first message, second message, the data traffic, other wireless device application and/or the like are met. Example criteria may be based, at least in part, on message size, content size, content bit rate, and/or the like. Therefore, it is possible to set up a scenario wherein the example embodiments may not be needed. But when the one or more criteria is met, then the example embodiments may be applied.

According to some of the various aspects of embodiments, a base station could be a femto-cell, a relay node, a macro base station, a micro base station, and/or the like. The base station 902 may receive a first message 903 from the wireless device over a first plurality of subcarriers of a first uplink carrier in the plurality of uplink carriers. There may be no guard band between any two subcarriers in the first plurality of subcarriers. The base station may transmit a second message 904 originated from server(s) 908 ... 909 on a downlink carrier to the wireless device 901. The second message 904 may be a server response to the first message 903. The downlink carrier may correspond to the first uplink carrier. The base station may receive at least one data packet from the wireless device over a second plurality of subcarriers of the first uplink carrier. There may be no guard band between any two subcarriers in the second plurality of subcarriers. The at least one data packet may comprises a first portion of the data targeted to the server.

The base station may transmit at least one packet to the wireless device. At least one packet may be originated from the server(s) in response to at least one data packet transmitted by the wireless device. The base station may transmit an activation command to the wireless device. The activation command may be configured to cause the activation of at least one additional uplink carrier in the plurality of uplink carriers (e.g. the activation command may cause activation of at least one additional cell including at the least one additional uplink carrier). The base station may receive a plurality of data packets destined to server(s) from the wireless device over the first uplink carrier and the at least one additional uplink carrier over a third plurality of subcarriers. There may be at least one guard band between at least two subcarriers in the third plurality of subcarriers. The second plurality of packets may comprise a second portion of the data.

According to some of the various aspects of embodiments, the base station 902 may receive a first message 903 from the wireless device 901 over a first plurality of subcarriers of a first uplink carrier in the plurality of uplink carriers. There may be no guard band between any two subcarriers in the first plurality of subcarriers. The base station 902 may transmit a second message 904 originated from server(s) 908 ... 909 on a downlink carrier to the wireless device. The second message may be transmitted in response to the first message. The downlink carrier may correspond to the first uplink carrier.

The base station may transmit an activation command to the wireless device. The activation command may be configured to cause the activation of at least one additional uplink carrier in the plurality of uplink carriers. The base station may receive a plurality of data packets destined to server(s) from the wireless device over the first uplink carrier and the at least one additional uplink carrier over a third plurality of subcarriers. There may be at least one guard band between at least two subcarriers in the third plurality of subcarriers. The second plurality of packets comprises a portion of the data. In an example embodiment, the base station may receive at least one packet destined to the server(s) from the wireless device over a second plurality of subcarriers of the first uplink carrier before receiving the activation command. There may be no guard band between any two subcarriers in the second plurality of subcarriers. In another example embodiment, the base station may not receive at least one packet destined to the server from the wireless device before receiving the activation command.

In an example embodiment, the first message 903 may cause establishment of a connection with the server(s), and/or may cause start of data transmission to the server(s) 908 ... 909. The first message may comprise payload data. The first message may be a request message to establish a connection. The second message 904 may comprise an acknowledgement for a received packet and/or message, information about server configuration parameters, and/or security parameters of a connection between server(s) and the wireless device. The second message may establish a connection between server(s) and the wireless device. The wireless device may include a buffer status report in a MAC packet of the first message 903 or in the at least one data packet 905 in a MAC subheader of the packet. The buffer status report may indicate the buffer size in the wireless device. The base station may transmit the activation command, at least in part, based on the size of the reported buffer. The base station may process received packets from the wireless device before forwarding the packet to server(s). The packet processing may comprise removing MAC sub-headers such as buffer status report, re-assembly, decoding, decryption, and/or the like.

The first portion of the data may be transmitted before the second portion of the data. The first portion of the data may be transmitted in a first time period and the second portion of the data traffic is transmitted in a second time period, wherein: the first time period and the second time period may not overlap; and the first time period may be before the second time period.

Each data packet in the at least one data packet and the plurality of data packets may be encrypted packets. The at least one data packet and the plurality of data packets may be encrypted using an encryption key and at least one parameter that may change substantially rapidly over time, for example, may be derived from a system counter such frame or sub-frame number. The encryption may be performed by PDCP layer before the data is segmented into MAC data packets. The wireless device may receive the activation command from the base station without encryption.

The first plurality of subcarriers, the second plurality of subcarriers and third plurality of subcarriers may be a plurality of OFDM subcarriers or a plurality of SC-FDMA subcarriers. The first plurality of subcarriers, the second plurality of subcarriers and third plurality of subcarriers may comprise data subcarrier symbols and pilot subcarrier symbols. The wireless device may deactivate one of the additional uplink carrier(s) if a timer associated with one of the additional uplink carrier(s) expires after a last packet queued for transmission over one of the additional uplink carrier(s) is received. The first message, the second message, the first portion of the data traffic, and the second portion of the data traffic could be transmitted over the same radio bearer. The radio bearer could be assigned a plurality of attributes including: a scheduling priority, an allocation and retention priority, a wireless device aggregate maximum bit rate, a combination of the above, and/or the like.

The plurality of data packets may consist of a first subset and a second subset. The first subset may be transmitted over the first uplink carrier and the second subset may be transmitted over additional uplink carrier(s). A scheduling control packet may be received before each data packet in the at least one data packet and the plurality of data packets is transmitted. The scheduling control packet may include information about the subcarriers used for data packet transmission. A data packet may refer to a MAC packet or transport block. The base station may process the received data packets before forwarding them to the server. For example, the base station may remove headers, de-assemble, decrypt, and/or decode the received packets.

Each data packet may be transmitted in two parts. A first part may be transmitted on a first subset of the third plurality of subcarriers in a first time period and a second part may be transmitted on a second subset of the third plurality of subcarriers in a second time period. At least one of the following constraints may be apply: the first time period and the second time period may not overlap; the first subset of the third plurality of subcarriers and the second subset of the third plurality of subcarriers may be different; the first subset of the third plurality of subcarriers may consist of a plurality of contiguous subcarriers; the second subset of the third plurality of subcarriers may consist of a plurality of contiguous subcarriers; a combination of the above and/or the like.

FIG. 9 depicts an example message flows between a base station 902, a wireless device 901, and one or more servers 908 . . . 909, as per an aspect of an embodiment of the present invention. Wireless device 901 may transmit a first message 903 to the server(s) 908 . . . 909 via the base station 902 over a first plurality of subcarriers of a first uplink carrier in the plurality of uplink carriers. There may be no guard band between any two subcarriers in the first plurality of subcarriers. The wireless device 901 may receive a second message 904 from the server via base station 902 on a downlink carrier. The second message 904 may respond to the first message 903. The downlink carrier may correspond to the first uplink carrier. Wireless device 901 may, depending of the configuration of servers 908 . . . 909 be connected to one or more severs. In many situations, wireless device 901 may act as if it is connected to a single server, when in fact, the wireless device 901 is connected to multiple servers. For the purpose of this disclosure the term "server(s)" reflects that wireless device 901 may be connected to a server configuration that may include one server, or a multitude of servers.

According to some of the various aspects of embodiments, the wireless device 901 may transmit at least one data packet 905 to server(s) 908 . . . 909 via the base station over a second plurality of subcarriers of the first uplink carrier. There may be no guard band between any two subcarriers in the second plurality of subcarriers. At least one data packet may comprises a first portion of the data traffic destined to the server. The wireless device 901 may receive at least one packet from the server via the base station in response to the at least one data packet. The wireless device may also receive an activation command 906 originated by the base station 902. The activation command may be configured to cause the activation of at least one additional uplink carrier in the plurality of uplink carriers. The wireless device may transmit a plurality of data packets to the server(s) via the base station over the first uplink carrier and the at least one additional uplink carrier over a third plurality of subcarriers. There may be at least one guard band between at least two subcarriers in the third plurality of subcarriers. The second plurality of packets may comprise a second portion of the data.

According to some of the various aspects of embodiments, the wireless device 901 may transmit a first message 903 to the server(s) via the base station 902 over a first plurality of subcarriers of a first uplink carrier in the plurality of uplink carriers. There may be no guard band between any two subcarriers in the first plurality of subcarriers. The wireless device may receive a second message from the server(s) 908 . . . 909 via the base station on a downlink carrier. The second message may be a response to the first message. The downlink carrier corresponds to the first uplink carrier. The wireless device 901 may receive an activation command 906 from a base station 902. The activation command 906 may be configured to cause the activation of at least one additional uplink carrier in the plurality of uplink carriers. The wireless device 901 may transmit a plurality of data packets 906 to the server via the base station 902 over the first uplink carrier and the at least one additional uplink carrier over a third plurality of subcarriers. There may be at least one guard band between at least two subcarriers in the third plurality of subcarriers. The second plurality of packets may comprise a portion of data that the wireless device intends to transmit to the server(s). In an example embodiment, the wireless device may transmit at least one packet to the server(s) via the base station over a second plurality of subcarriers of the first uplink carrier before receiving the activation command. There may be no guard band between any two subcarriers in the second plurality of subcarriers. In another example embodiment, the wireless device may not transmit at least one packet to the server(s) before receiving the activation command.

According to some of the various aspects of embodiments, the activation command by the base station may be configured to cause activation of a cell. A cell may comprise a downlink carrier and zero or one uplink carrier employed for data transmission. This may be referred to activating a carrier (downlink and/or uplink) in this specification. In implementation, the MAC activation command may be configured to activate a cell, and cell activation may include carrier activation. The activation process may be controlled by a base station MAC layer, and may be performed selectively based on one or more criteria. The disclosed mechanism may be performed when certain criteria for the first message, second message, the data traffic, other wireless device application and/or the like are met. Example criteria may be based, at least in part, on message size, content size, content bit rate, and/or the like. Therefore, it is possible to set up a scenario wherein the example embodiments may not be needed. But when the one or more criteria is met, then the example embodiments may be applied.

According to some of the various aspects of embodiments, a base station could be a femto-cell, a relay node, a macro base station, a micro base station, and/or the like. The base station 902 may receive a first message 903 from the wireless device over a first plurality of subcarriers of a first uplink carrier in the plurality of uplink carriers. There may be no guard band between any two subcarriers in the first plurality of subcarriers. The base station may transmit a second message 904 originated from server(s) 908 . . . 909 on a downlink carrier to the wireless device 901. The second message 904 may be a server response to the first message 903. The downlink carrier may correspond to the first uplink carrier. The base station may receive at least one data packet from the wireless device over a second plurality of subcarriers of the first uplink carrier. There may be no guard band between any two subcarriers in the second plurality of subcarriers. The at least one data packet may comprises a first portion of the data targeted to the server.

The base station may transmit at least one packet to the wireless device. At least one packet may be originated from the server(s) in response to at least one data packet transmitted by the wireless device. The base station may transmit an activation command to the wireless device. The activation command may be configured to cause the activation of at least one additional uplink carrier in the plurality of uplink carriers (e.g. the activation command may cause activation of at least one additional cell including at the least one additional uplink carrier). The base station may receive a plurality of data packets destined to server(s) from the wireless device over the first uplink carrier and the at least one additional uplink carrier over a third plurality of subcarriers. There may be at least one guard band between at least two subcarriers in the third plurality of subcarriers. The second plurality of packets may comprise a second portion of the data.

According to some of the various aspects of embodiments, the base station 902 may receive a first message 903 from the wireless device 901 over a first plurality of subcarriers of a first uplink carrier in the plurality of uplink carriers. There may be no guard band between any two subcarriers in the first plurality of subcarriers. The base station 902 may transmit a second message 904 originated from server(s) 908 . . . 909 on a downlink carrier to the wireless device. The second message may be transmitted in response to the first message. The downlink carrier may correspond to the first uplink carrier.

The base station may transmit an activation command to the wireless device. The activation command may be configured to cause the activation of at least one additional uplink carrier in the plurality of uplink carriers. The base station may receive a plurality of data packets destined to server(s) from the wireless device over the first uplink carrier and the at least one additional uplink carrier over a third plurality of subcarriers. There may be at least one guard band between at least two subcarriers in the third plurality of subcarriers. The second plurality of packets comprises a portion of the data. In an example embodiment, the base station may receive at least one packet destined to the server(s) from the wireless device over a second plurality of subcarriers of the first uplink carrier before receiving the activation command. There may be no guard band between any two subcarriers in the second plurality of subcarriers. In another example embodiment, the base station may not receive at least one packet destined to the server from the wireless device before receiving the activation command.

In an example embodiment, the first message 903 may cause establishment of a connection with the server(s), and/or may cause start of data transmission to the server(s) 908 . . . 909. The first message may comprise payload data. The first message may be a request message to establish a connection. The second message 904 may comprise an acknowledgement for a received packet and/or message, information about server configuration parameters, and/or security parameters of a connection between server(s) and the wireless device. The second message may establish a connection between server(s) and the wireless device. The wireless device may include a buffer status report in a MAC packet of the first message 903 or in the at least one data packet 905 in a MAC subheader of the packet. The buffer status report may indicate the buffer size in the wireless device. The base station may transmit the activation command, at least in part, based on the size of the reported buffer. The base station may process received packets from the wireless device before forwarding the packet to server(s). The packet processing may comprise removing MAC sub-headers such as buffer status report, re-assembly, decoding, decryption, and/or the like.

The first portion of the data may be transmitted before the second portion of the data. The first portion of the data may be transmitted in a first time period and the second portion of the data traffic is transmitted in a second time period, wherein: the first time period and the second time period may not overlap; and the first time period may be before the second time period.

Each data packet in the at least one data packet and the plurality of data packets may be encrypted packets. The at least one data packet and the plurality of data packets may be encrypted using an encryption key and at least one parameter that may change substantially rapidly over time, for example, may be derived from a system counter such frame or subframe number. The encryption may be performed by PDCP layer before the data is segmented into MAC data packets. The wireless device may receive the activation command from the base station without encryption.

The first plurality of subcarriers, the second plurality of subcarriers and third plurality of subcarriers may be a plurality of OFDM subcarriers or a plurality of SC-FDMA subcarriers. The first plurality of subcarriers, the second plurality of subcarriers and third plurality of subcarriers may comprise data subcarrier symbols and pilot subcarrier symbols. The wireless device may deactivate one of the additional uplink carrier(s) if a timer associated with one of the additional uplink carrier(s) expires after a last packet queued for transmission over one of the additional uplink carrier(s) is received. The first message, the second message, the first portion of the data traffic, and the second portion of the data traffic could be transmitted over the same radio bearer. The radio bearer could be assigned a plurality of attributes including: a scheduling priority, an allocation and retention priority, a wireless device aggregate maximum bit rate, a combination of the above, and/or the like.

The plurality of data packets may consist of a first subset and a second subset. The first subset may be transmitted over the first uplink carrier and the second subset may be transmitted over additional uplink carrier(s). A scheduling control packet may be received before each data packet in the at least one data packet and the plurality of data packets is transmitted. The scheduling control packet may include information about the subcarriers used for data packet transmission. A data packet may refer to a MAC packet or transport block. The base station may process the received data packets before forwarding them to the server. For example, the base station may remove headers, de-assemble, decrypt, and/or decode the received packets.

Each data packet may be transmitted in two parts. A first part may be transmitted on a first subset of the third plurality of subcarriers in a first time period and a second part may be transmitted on a second subset of the third plurality of subcarriers in a second time period. At least one of the following constraints may be apply: the first time period and the second time period may not overlap; the first subset of the third plurality of subcarriers and the second subset of the third plurality of subcarriers may be different; the first subset of the third plurality of subcarriers may consist of a plurality of contiguous subcarriers; the second subset of the third plurality of subcarriers may consist of a plurality of contiguous subcarriers; a combination of the above and/or the like.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

The precoder may receive a block of vectors from the layer mapping and generate a block of vectors to be mapped onto resources on the antenna port(s). Precoding for spatial multiplexing using antenna port(s) with cell-specific reference signals may be used in combination with layer mapping for spatial multiplexing. Spatial multiplexing may support two or four antenna ports and the set of antenna ports used may be {0,1} or {0, 1, 2, 3}. Precoding for transmit diversity may be used in combination with layer mapping for transmit diversity. The precoding operation for transmit diversity may be defined for two and four antenna ports. Precoding for spatial multiplexing using antenna ports with UE-specific reference signals may also, for example, be used in combination with layer mapping for spatial multiplexing. Spatial multiplexing using antenna ports with UE-specific reference signals may support up to eight antenna ports. Reference signals may be pre-defined signals that may be used by the receiver for decoding the received physical signal, estimating the channel state, and/or other purposes.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M×N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of precoded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula (s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation, f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

Physical control format indicator channel(s) (PCFICH) may carry information about the number of OFDM symbols used for transmission of PDCCHs (physical downlink control channel) in a subframe. The set of OFDM symbols possible to use for PDCCH in a subframe may depend on many parameters including, for example, downlink carrier bandwidth, in terms of downlink resource blocks. PCFICH transmitted in one subframe may be scrambled with cell-specific sequence(s) prior to modulation, resulting in a block of scrambled bits. A scrambling sequence generator(s) may be initialized at the start of subframe(s). Block (s) of scrambled bits may be modulated using QPSK. Block(s) of modulation symbols may be mapped to at least one layer and precoded resulting in a block of vectors representing the signal for at least one antenna port. Instances of PCFICH control channel(s) may indicate one of several (e.g. 3) possible values after being decoded. The range of possible values of instance(s) of the first control channel may depend on the first carrier bandwidth.

According to some of the various embodiments, physical downlink control channel(s) may carry scheduling assignments and other control information. The number of resource-elements not assigned to PCFICH or PHICH may be assigned to PDCCH. PDCCH may support multiple formats. Multiple PDCCH packets may be transmitted in a subframe. PDCCH may be coded by tail biting convolutionally encoder before transmission. PDCCH bits may be scrambled with a cell-specific sequence prior to modulation, resulting in block(s) of scrambled bits. Scrambling sequence generator(s) may be initialized at the start of subframe(s). Block(s) of scrambled bits may be modulated using QPSK. Block(s) of modulation symbols may be mapped to at least one layer and precoded resulting in a block of vectors representing the signal for at least one antenna port. PDCCH may be transmitted on the same set of antenna ports as the PBCH, wherein PBCH is a physical broadcast channel broadcasting at least one basic system information field.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. OFDM subcarriers that are allocated for transmission of PDCCH may occupy the bandwidth of downlink carrier(s). PDCCH channel(s) may carry a plurality of downlink control packets in subframe(s). PDCCH may be transmitted on downlink carrier(s) starting from the first OFDM symbol of subframe(s), and may occupy up to multiple symbol duration(s) (e.g. 3 or 4).

According to some of the various embodiments, PHICH may carry the hybrid-ARQ (automatic repeat request) ACK/NACK. Multiple PHICHs mapped to the same set of resource elements may constitute a PHICH group, where PHICHs within the same PHICH group may be separated through different orthogonal sequences. PHICH resource(s) may be identified by the index pair (group, sequence), where group(s) may be the PHICH group number(s) and sequence(s) may be the orthogonal sequence index within the group(s). For frame structure type 1, the number of PHICH groups may depend on parameters from higher layers (RRC). For frame structure type 2, the number of PHICH groups may vary between downlink subframes according to a pre-defined arrangement. Block(s) of bits transmitted on one PHICH in one subframe may be modulated using BPSK or QPSK, resulting in a block(s) of complex-valued modulation symbols. Block(s) of modulation symbols may be symbol-wise multiplied with an orthogonal sequence and scrambled, resulting in a sequence of modulation symbols Other arrangements for PCFICH, PHICH, PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a first downlink carrier for random access response(s), in a random access response window. There may be a pre-known identifier in PDCCH that indentifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may include a configurable timer (timeAlignmentTimer) that may be used to control how long the wireless device is considered uplink time aligned. When a timing alignment command MAC control element is received, the wireless device may apply the timing alignment command and start or restart timeAlignmentTimer. The wireless device may not perform any uplink transmission except the random access preamble transmission when timeAlignmentTimer is not running or when it exceeds its limit. The time alignment command may substantially align frame and subframe reception timing of a first uplink carrier and at least one additional uplink carrier. According to some of the various aspects of embodiments, the time alignment command value range employed during a random access process may be substantially larger than the time alignment command value range during active data transmission. In an example embodiment, uplink transmission timing may be maintained on a per time alignment group (TAG) basis. Carrier(s) may be grouped in TAGs, and TAG(s) may have their own downlink timing reference, time alignment timer, and/or time alignment commands. Group(s) may have their own random access process. Time alignment commands may be directed to a time alignment group. The TAG, including the primary cell may be called a primary TAG (pTAG) and the TAG not including the primary cell may be called a secondary TAG (sTAG).

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

According to some of the various aspects of embodiments, data packet(s) may be encrypted before transmission to secure packet(s) from unwanted receiver(s). Desired recipient(s) may be able to decrypt the packet(s). A first plurality of data packet(s) and/or a second plurality of data packet(s) may be encrypted using an encryption key and at least one parameter that may change substantially rapidly over time. The encryption mechanism may provide a transmission that may not be easily eavesdropped by unwanted receivers. The encryption mechanism may include additional parameter(s) in an encryption module that changes substantially rapidly in time to enhance the security mechanism. Example varying parameter(s) may comprise various types of system counter(s), such as system frame number. Substantially rapidly may for example imply changing on a per subframe, frame, or group of subframes basis. Encryption may be provided by a PDCP layer between the transmitter and receiver, and/or may be provided by the application layer. Additional overhead added to packet(s) by lower layers such as RLC, MAC, and/or Physical layer may not be encrypted before transmission. In the receiver, the plurality of encrypted data packet(s) may be decrypted using a first decryption key and at least one first parameter. The plurality of data packet(s) may be decrypted using an additional parameter that changes substantially rapidly over time.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI(precoding matrix indicator)/RI(ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer.

According to some of the various aspects of embodiments, subcarriers and/or resource blocks may comprise a plurality of physical subcarriers and/or resource blocks. In another example embodiment, subcarriers may be a plurality of virtual and/or logical subcarriers and/or resource blocks.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, subcarriers may include data subcarrier symbols and pilot subcarrier symbols. Pilot symbols may not carry user data, and may be included in the transmission to help the receiver to perform synchronization, channel estimation and/or signal quality detection. Base stations and wireless devices (wireless receiver) may use different methods to generate and transmit pilot symbols along with information symbols.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like. According to some of the various aspects of embodiments of the present invention, layer 1 (physical layer) may be based on OFDMA or SC-FDMA. Time may be divided into frame(s) with fixed duration. Frame(s) may be divided into substantially equally sized subframes, and subframe(s) may be divided into substantially equally sized slot(s). A plurality of OFDM or SC-FDMA symbol(s) may be transmitted in slot(s). OFDMA or SC-FDMA symbol(s) may be grouped into resource block(s). A scheduler may assign resource(s) in resource block unit(s), and/or a group of resource block unit(s). Physical resource block(s) may be resources in the physical layer, and logical resource block(s) may be resource block(s) used by the MAC layer. Similar to virtual and physical subcarriers, resource block(s) may be mapped from logical to physical resource block(s). Logical resource block(s) may be contiguous, but corresponding physical resource block(s) may be non-contiguous. Some of the various embodiments of the present invention may be implemented at the physical or logical resource block level(s).

According to some of the various aspects of embodiments, layer 2 transmission may include PDCP (packet data convergence protocol), RLC (radio link control), MAC (media access control) sub-layers, and/or the like. MAC may be responsible for the multiplexing and mapping of logical channels to transport channels and vice versa. A MAC layer may perform channel mapping, scheduling, random access channel procedures, uplink timing maintenance, and/or the like.

According to some of the various aspects of embodiments, the MAC layer may map logical channel(s) carrying RLC PDUs (packet data unit) to transport channel(s). For transmission, multiple SDUs (service data unit) from logical channel(s) may be mapped to the Transport Block (TB) to be sent over transport channel(s). For reception, TBs from transport channel(s) may be demultiplexed and assigned to corresponding logical channel(s). The MAC layer may perform scheduling related function(s) in both the uplink and downlink and thus may be responsible for transport format selection associated with transport channel(s). This may include HARQ functionality. Since scheduling may be done at the base station, the MAC layer may be responsible for reporting scheduling related information such as UE (user equipment or wireless device) buffer occupancy and power headroom. It may also handle prioritization from both an inter-UE and intra-UE logical channel perspective. MAC may also be responsible for random access procedure(s) for the uplink that may be performed following either a contention and non-contention based process. UE may need to maintain timing synchronization with cell(s). The MAC layer may perform procedure(s) for periodic synchronization.

According to some of the various aspects of embodiments, the MAC layer may be responsible for the mapping of multiple logical channel(s) to transport channel(s) during transmission(s), and demultiplexing and mapping of transport channel data to logical channel(s) during reception. A MAC PDU may include of a header that describes the format of the PDU itself, which may include control element(s), SDUs, Padding, and/or the like. The header may be composed of multiple sub-headers, one for constituent part(s) of the MAC PDU. The MAC may also operate in a transparent mode, where no header may be pre-pended to the PDU. Activation command(s) may be inserted into packet(s) using a MAC control element.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

According to some of the various aspects of embodiments, an RLC sub-layer may control the applicability and functionality of error correction, concatenation, segmentation, re-segmentation, duplicate detection, in-sequence delivery, and/or the like. Other functions of RLC may include protocol error detection and recovery, and/or SDU discard. The RLC sub-layer may receive data from upper layer radio bearer(s) (signaling and data) called service data unit(s) (SDU). The transmission entities in the RLC layer may convert RLC SDUs to RLC PDU after performing functions such as segmentation, concatenation, adding RLC header(s), and/or the like. In the other direction, receiving entities may receive RLC PDUs from the MAC layer. After performing reordering, the PDUs may be assembled back into RLC SDUs and delivered to the upper layer. RLC interaction with a MAC layer may include: a) data transfer for uplink and downlink through logical channel(s); b) MAC notifies RLC when a transmission opportunity becomes available, including the size of total number of RLC PDUs that may be transmitted in the current transmission opportunity, and/or c) the MAC entity at the transmitter may inform RLC at the transmitter of HARQ transmission failure.

According to some of the various aspects of embodiments, PDCP (packet data convergence protocol) may comprise a layer 2 sub-layer on top of RLC sub-layer. The PDCP may be responsible for a multitude of functions. First, the PDCP layer may transfer user plane and control plane data to and from upper layer(s). PDCP layer may receive SDUs from upper layer(s) and may send PDUs to the lower layer(s). In other direction, PDCP layer may receive PDUs from the lower layer(s) and may send SDUs to upper layer(s). Second, the PDCP may be responsible for security functions. It may apply ciphering (encryption) for user and control plane bearers, if configured. It may also perform integrity protection for control plane bearer(s), if configured. Third, the PDCP may perform header compression service(s) to improve the efficiency of over the air transmission. The header compression may be based on robust header compression (ROHC). ROHC may be performed on VoIP packets. Fourth, the PDCP may be responsible for in-order delivery of packet(s) and duplicate detection service(s) to upper layer(s) after handover(s). After handover, the source base station may transfer unacknowledged packet(s)s to target base station when operating in RLC acknowledged mode (AM). The target base station may forward packet(s)s received from the source base station to the UE (user equipment).

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods. In particular, it should be noted that, for example purposes, the above explanation has focused on the example(s) of a encrypted voice and data packets which are transmitted and received by wireless transceivers. However, one will recognize that embodiments of the invention could be implemented in a system, in which packets are not encrypted. In such a system, un-encrypted voice and data packets may be transmitted and received as described in this specification.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:

transmitting a first message destined for a server, by a wireless device to a base station, over a first plurality of subcarriers of a first uplink carrier in a plurality of configured uplink carriers, wherein there is no guard band between any two subcarriers in said first plurality of subcarriers;

receiving a second message originating from said server, by said wireless device, from said base station on a downlink carrier, said second message responding to said first message, said downlink carrier corresponding to said first uplink carrier;

transmitting at least one data packet destined for said server, by said wireless device to said base station over a second plurality of subcarriers of said first uplink carrier, wherein there is no guard band between any two subcarriers in said second plurality of subcarriers, said at least one data packet comprising a first portion of content destined for said server;

receiving at least one packet originating from said server, by said wireless device from said base station on said downlink carrier in response to said at least one data packet;

receiving an activation command originating from said base station on said downlink carrier, at least one additional uplink carrier in said plurality of configured uplink carriers activating in response to said activation command; and transmitting a plurality of data packets destined for said server, by said wireless device, to said base station over said first uplink carrier and at least one of said at least one additional uplink carrier over a third plurality of subcarriers, wherein there is at least one guard band between at least two subcarriers in said third plurality of subcarriers, said plurality of data packets comprising a second portion of said content destined for said server.

2. The method of claim 1, wherein said first message is a request message to establish a connection.

3. The method of claim 1, wherein said second message comprises an acknowledgement for a received packet.

4. The method of claim 1, wherein said second message comprises information about server configuration parameters.

5. The method of claim 1, wherein said first message or said at least one data packet comprises a buffer status report indicating a buffer size of said wireless device.

6. The method of claim 1, wherein said at least one data packet and said plurality of data packets are encrypted using an encryption key and at least one parameter configured to change substantially rapidly over time.

7. The method of claim 1, wherein said activation command is received from said base station without encryption.

8. The method of claim 1, wherein said first plurality of subcarriers, said second plurality of subcarriers and said third plurality of subcarriers are:

a plurality of OFDM subcarriers; or a plurality of SC-FDMA subcarriers.

9. The method of claim 1, further comprising deactivating, by said wireless device, one of said at least one additional uplink carrier if a timer associated with said one of said at least one additional uplink carrier expires after a last content packet queued for transmission by said base station over said one of said at least one additional uplink carrier is received.

10. The method of claim 1, wherein said first message, said second message, said first portion of said content, and said second portion of said content are transmitted over the same radio bearer.

11. The method of claim 1, further comprising receiving, by said wireless device, a scheduling control packet before each data packet in said at least one data packet and said plurality of data packets is transmitted, said scheduling control packet comprising information about subcarriers used for data packet transmission.

12. The method of claim 1, wherein:

each data packet in said plurality of data packets has a first and a second part;

said first part transmitted on a first subset of said third plurality of subcarriers in a first time period;

said second part transmitted on a second subset of said third plurality of subcarriers in a second time period;

said first time period and said second time period do not overlap;

said first subset of said third plurality of subcarriers and said second subset of said third plurality of subcarriers are different;

said first subset of said third plurality of subcarriers consists of a plurality of contiguous subcarriers; and said second subset of said third plurality of subcarriers consists of a plurality of contiguous subcarriers.

13. A wireless device comprising:
one or more communication interfaces;
one or more processors; and
memory storing instructions that, when executed, cause the wireless device to:
transmit a first message destined for a server to a base station, over a first plurality of subcarriers of a first uplink carrier in a plurality of configured uplink carriers, wherein there is no guard band between any two subcarriers in said first plurality of subcarriers;
receive a second message originating from said server, from said base station on a downlink carrier, said second message responding to said first message, said downlink carrier corresponding to said first uplink carrier;
transmit at least one data packet destined for said server, to said base station over a second plurality of subcarriers of said first uplink carrier, wherein there is no guard band between any two subcarriers in said second plurality of subcarriers, said at least one data packet comprising a first portion of content destined for said server;
receiving at least one packet originating from said server, on said downlink carrier in response to said at least one data packet;
receive an activation command originating from said base station, at least one additional uplink carrier in said plurality of configured uplink carriers activating in response to said activation command; and
transmit a plurality of data packets destined for said server, to said base station over said first uplink carrier and at least one of said at least one additional uplink carrier over a third plurality of subcarriers, wherein there is at least one guard band between at least two subcarriers in said third plurality of subcarriers, said plurality of data packets comprising a second portion of said content destined for said server.

14. The wireless device of claim 13, wherein, said wireless device transmits at least one packet to said server via said base station over a second plurality of subcarriers of said first uplink carrier before receiving said activation command, wherein there is no guard band between any two subcarriers in said second plurality of subcarriers.

15. The wireless device of claim 13, wherein:
each data packet in said plurality of data packets has a first and a second part;
said first part transmitted on a first subset of said third plurality of subcarriers in a first time period;
said second part transmitted on a second subset of said third plurality of subcarriers in a second time period;
said first time period and said second time period do not overlap;
said first subset of said third plurality of subcarriers and said second subset of said third plurality of subcarriers are different;
said first subset of said third plurality of subcarriers consists of a plurality of contiguous subcarriers; and
said second subset of said third plurality of subcarriers consists of a plurality of contiguous subcarriers.

16. A method comprising:
receiving a first message destined for a server, by a base station from a wireless device, over a first plurality of subcarriers of a first uplink carrier in a plurality of configured uplink carriers, wherein there is no guard band between any two subcarriers in said first plurality of subcarriers;
transmitting a second message originating from said server, by said base station, to said wireless device on a downlink carrier, said second message responding to said first message, said downlink carrier corresponding to said first uplink carrier;
receiving at least one data packet destined for said server, by said base station, from said wireless device over a second plurality of subcarriers of said first uplink carrier, wherein there is no guard band between any two subcarriers in said second plurality of subcarriers, said at least one data packet comprising a first portion of content destined for said server;
transmitting at least one packet originating from said server, by said base station, to said wireless device on said downlink carrier in response to said at least one data packet;
transmitting an activation command originating from said base station to said wireless device on said downlink carrier, at least one additional uplink carrier in said plurality of configured uplink carriers activating in response to said activation command; and
receiving a plurality of data packets destined for said server, by said base station, from said wireless device over said first uplink carrier and at least one of said at least one additional uplink carrier over a third plurality of subcarriers, wherein there is at least one guard band between at least two subcarriers in said third plurality of subcarriers, said plurality of data packets comprising a second portion of said content destined for said server.

17. The method of claim 16, further comprising, said receiving a buffer status report from said wireless device; said buffer status report included in said first message or in said at least one data packet; said buffer status report indicates the buffer size in said wireless device.

18. The method of claim 16, further comprising, said base station removing said buffer status report form said first message or said at least one data packet before forwarding said first message or said at least one data packet to said server.

19. The method of claim 16, wherein said first message, said second message, said first portion of said data traffic, and said second portion of said data traffic are received over the same radio bearer.

20. The method of claim 16, wherein said radio bearer is assigned a plurality of attributes including:
a scheduling priority;
an allocation and retention priority; and
a wireless device aggregate maximum bit rate.

* * * * *